United States Patent [19]
Fant

[11] Patent Number: 5,930,522
[45] Date of Patent: *Jul. 27, 1999

[54] INVOCATION ARCHITECTURE FOR GENERALLY CONCURRENT PROCESS RESOLUTION

[75] Inventor: Karl M. Fant, Minneapolis, Minn.

[73] Assignee: Theseus Research, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/481,999

[22] Filed: Jun. 7, 1995

Related U.S. Application Data

[63] Continuation-in-part of application No. 08/296,809, Aug. 26, 1994, Pat. No. 5,572,732, which is a continuation of application No. 07/837,641, Feb. 14, 1992, Pat. No. 5,355,496.

[51] Int. Cl.$^6$ .................................................. G06F 15/82
[52] U.S. Cl. ...................................................... 395/800.25
[58] Field of Search .................................... 395/570, 377, 395/800.18, 800.19, 800.25, 800.26, 800.27

[56] References Cited

U.S. PATENT DOCUMENTS

| | | | |
|---|---|---|---|
| 3,715,603 | 2/1973 | Lerch | 326/36 |
| 4,845,633 | 7/1989 | Furtek | 326/38 |
| 5,020,059 | 5/1991 | Gorin et al. | 395/182.01 |
| 5,021,947 | 6/1991 | Campbell et al. | 395/800.25 |
| 5,121,003 | 6/1992 | Williams | 326/121 |
| 5,291,427 | 3/1994 | Loyer et al. | 364/578 |
| 5,382,844 | 1/1995 | Knauer | 326/95 |

FOREIGN PATENT DOCUMENTS

| | | |
|---|---|---|
| 0 566 739 A1 | 10/1993 | European Pat. Off. . |
| 0 570 584 A1 | 11/1993 | European Pat. Off. . |
| 0 578 821 A1 | 1/1994 | European Pat. Off. . |
| WO 92/12498 | 7/1992 | WIPO . |
| WO 92/16971 | 10/1992 | WIPO . |
| WO 94/03929 | 2/1994 | WIPO . |

OTHER PUBLICATIONS

M.R. Greenstreet, T.E. Williams, and J. Staunstrup, Self-Timed Iteration, Elsevier Science Publishers B.V. (North-Holland), IFIP, 1988, pp. 309–322.

Teresa H.–Y. Meng, Robert W. Brodersen, and David G. Messerschmitt, Automatic Synthesis of Asynchronous Circuits from High–Level Specifications, IEEE Transactions on Computer–Aided Design, vol. 8, No. 11, Nov. 1989, pp. 1185–1205.

Ted Williams, Latency and Throughput Tradeoffs in Self-Timed Speed–Independent Pipelines and Rings, Stanford University Technical Report No. CSL–TR–91–482, May 1991.

Jens Sparso and Jorgen Staunstrup, Delay–insensitive multi–ring structures, Integration, the VLSI Journal 15, 1993, Elsevier Science Publishers B.V., pp. 313–340.

Tzyh–Yung Wuu and Sarma B.K. Vrudhula, A Design of a Fast and Area Efficient Multi–Input Muller C–element, IEEE Transactions on VLSI Systems, vol. 1, No. 2, Jun. 1993, pp. 215–219.

(List continued on next page.)

*Primary Examiner*—Parshotam S. Lall
*Assistant Examiner*—Kenneth R. Coulter
*Attorney, Agent, or Firm*—Steptoe & Johnson LLP

[57] ABSTRACT

An invocation architecture for generally concurrent process resolution comprises a plurality of interconnected processors, some of the processors being homogeneous processors and others of the processors being special purpose processors. Each homogeneous processor being capable of invoking a connected processor to have the connected processor resolve instructions. Each processor capable of being invoked by a connected processor to resolve instructions at the invocation of the connected processor.

19 Claims, 30 Drawing Sheets

OTHER PUBLICATIONS

Marc Renaudin and Bachar El Hassan, The Design of Fast Asynchronous Adder Structures and Their Implementation Using D.C.V.S. Logic, Int'l. Symposium on Circuits & Systems, vol. 4, 1994, pp. 291–294.

Richard G. Burford, Xingcha Fan and Neil W. Bergmann, An 180 Mhz 16 bit Multiplier Using Asynchronous Logic Design Techniques, IEEE 1994 Custom Integrated Circuits Conference, pp. 215–218.

Ted Williams, Self–Timed Rings and Their Application to Division, Stanford University Technical Report No. CSL–TR–91–482, May 1991.

David E. Muller, Asynchronous Logics and Application to Information Processing, Stanford University Press, Switching Theory In Space Technology, pp. 289–297, 1963.

Narinder Pal Singh, A Design Methodology For Self–Timed Systems, Massachusetts Institute of Technology, MIT/LCS/TR–258, Feb. 1981.

T.S. Anatharaman, A Delay Insensitive Regular Expression Recognizer, Dept. of Computer Science, Carnegie–Mellon University, CMU–CS–89–109, Jan. 1989.

Jens Sparso, et al., Design of Delay Insensitive Circuits Using Multi–Ring Structures, European Design Automation Conference, IEEE 0–8186–2780, pp. 15–20, Aug. 1992.

Lawrence G. Heller, et al., Cascode Voltage Switch Logic: A Different CMOS Logic Family, ISSCC 84 Digest of Technical Papers, IEEE, pp. 16–17, Feb. 1984.

Stephen H. Unger, Asynchronous Sequential Switching Circuits, 1969, pp. 221–229.

Carver Mead & Lynn Conway, Introduction to VLSI Systems, 1980, pp. 242–262.

Ivan E. Sutherland, Micropipelines, Communications of the ACM, Dec. 1989, vol. 32, No. 6.

Tadashi Shibata & Tadahiro Ohmi, A Functional MOS Transistor Featuring Gate–Level Weighted Sum and Threshold Operations, IEEE Transactions On Electron Devices, Dec. 1992, vol. 39, No. 6, pp. 1444–1445.

Anthony S. Wojcik & Kwang–Ya Fang, On The Design Of Three–Valued Asynchronous Modules, IEEE Transactions On Computers, Oct. 1980, vol. C–29, No. 10, pp. 889–989.

Mark Edward Dean, Strip: A Self–Time Risc Processor, Stanford University Computer Systems Laboratory Technical Report No. CSL–TR–92–543, Stanford, CA, Jul. 1992.

Daniel Hampel & Robert Winder, Threshold Logic, IEEE Spectrum, May 1971, pp. 32–39.

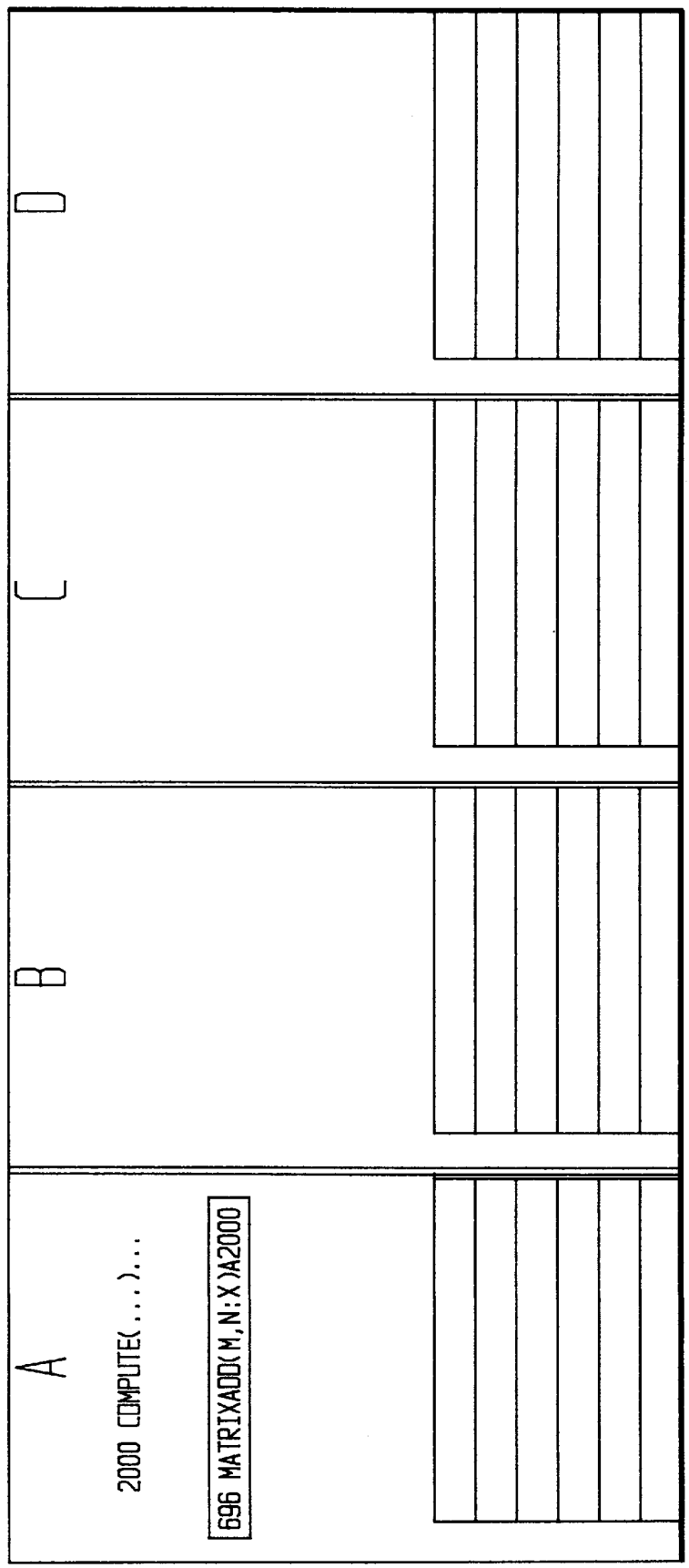

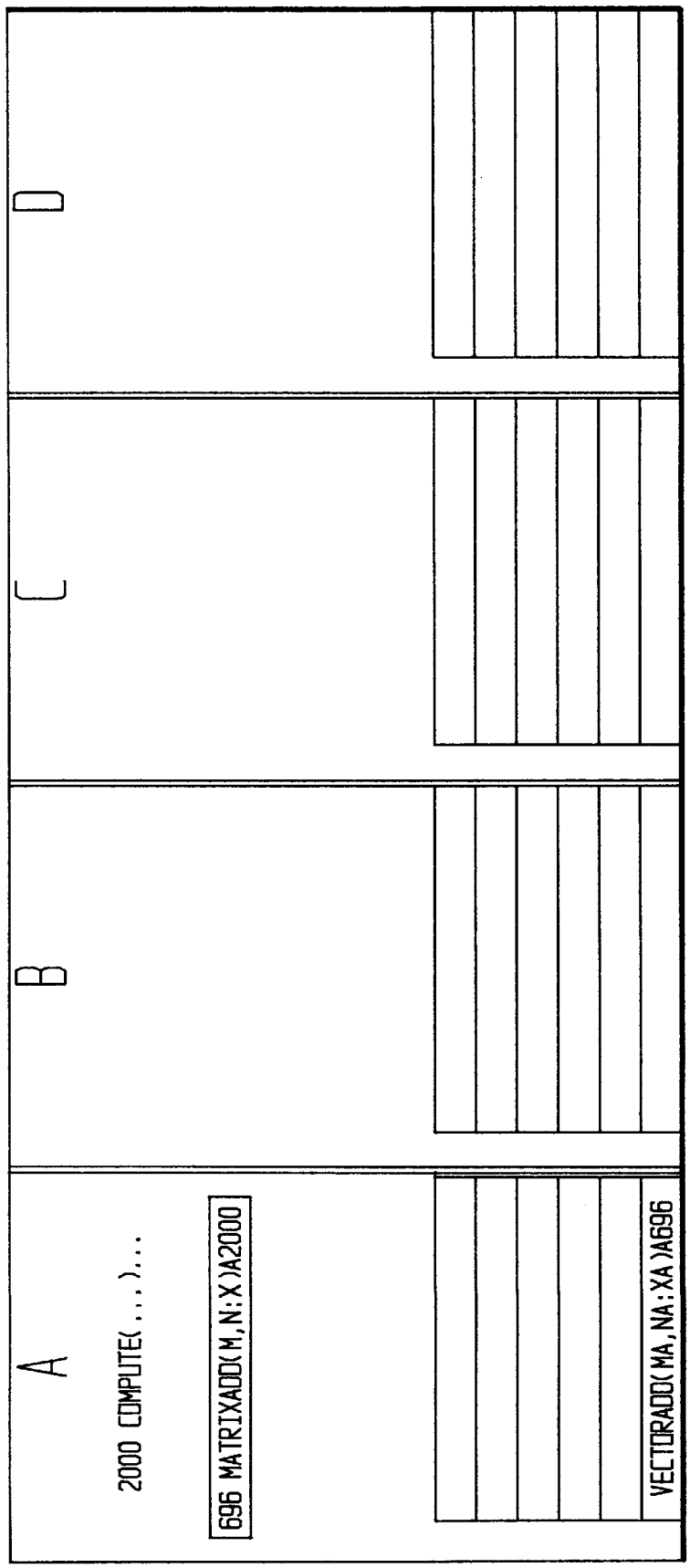

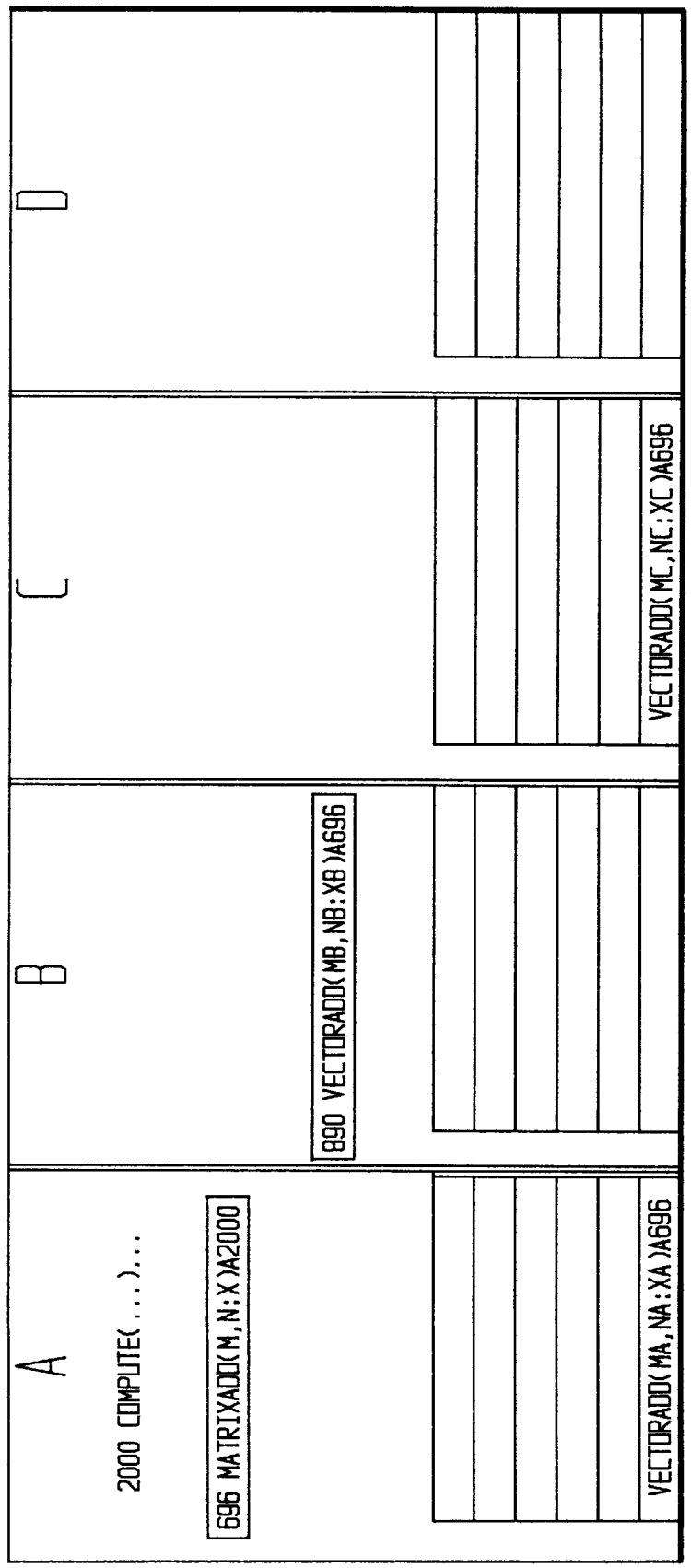

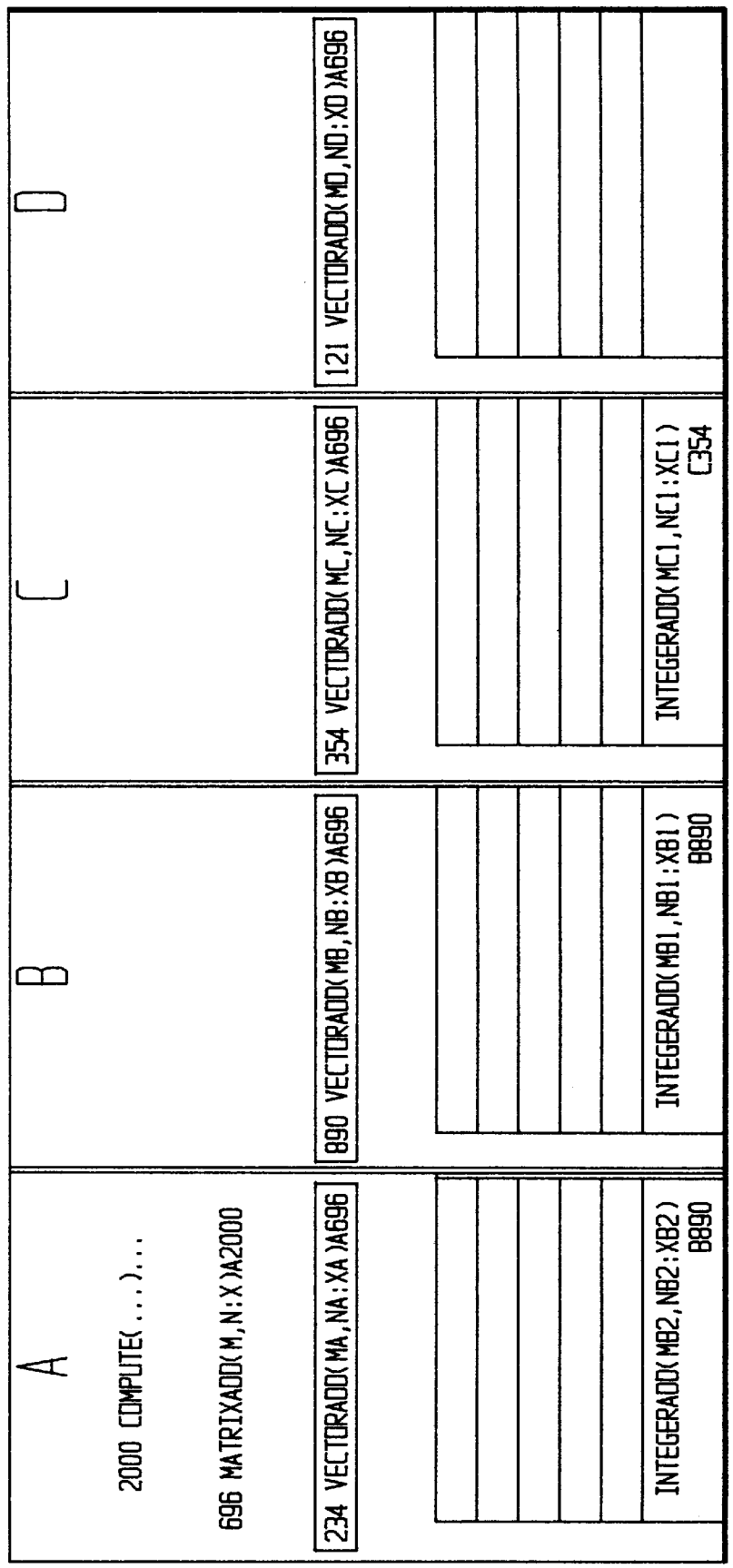

FIG. 10(i)

| A | B | C | D |
|---|---|---|---|
| 2000 COMPUTE(....).... | 760 INTEGERADD(MB1,NB1:XB1) B890 | 354 VECTORADD(MC,NC:XC)A696 | 121 VECTORADD(MD,ND:XD)A696 |
| 696 MATRIXADD(M,N:X)A2000 | 890 VECTORADD(MB,NB:XB)A696 | | |
| 234 VECTORADD(MA,NA:XA)A696 | | | |
| | | INTEGERADD(MD2,ND2:XD2) D121 | |
| | | INTEGERADD(MB3,NB3:XB3) B890 | INTEGERADD(MC3,NC3:XC3) C354 |
| INTEGERADD(MA1,NA1:XA1) A234 | INTEGERADD(MA2,NA2:XA2) A234 | INTEGERADD(MC1,NC1:XC1) C354 | INTEGERADD(MD1,ND1:XD1) D121 |
| INTEGERADD(MB2,NB2:XB2) B890 | INTEGERADD(MC2,NC2:XC2) C354 | | |

FIG.10(j)

| A | B | C | D |
|---|---|---|---|
| 2000 COMPUTE(...)... | 890 VECTORADD(MB,NB:XB)A696 | 678 INTEGERADD(MC1,NC1:XC1) C354 | 121 VECTORADD(MD,ND:XD)A696 |
| 696 MATRIXADD(M,N:X)A2000 | | 354 VECTORADD(MC,NC:XC)A696 | |
| 234 VECTORADD(MA,NA:XA)A696 | | | |
| INTEGERADD(MD3,ND3:XD3) D121 | RETURN 890 | | INTEGERADD(MA3,NA3:XA3) A234 |
| INTEGERADD(MA1,NA1:XA1) A234 | INTEGERADD(MA2,NA2:XA2) A234 | INTEGERADD(MD2,ND2:XD2) D121 | INTEGERADD(MC3,NC3:XC3) C354 |
| INTEGERADD(MB2,NB2:XB2) B890 | INTEGERADD(MC2,NC2:XC2) C354 | INTEGERADD(MB1,NB1:XB1) B890 | INTEGERADD(MD1,ND1:XD1) D121 |

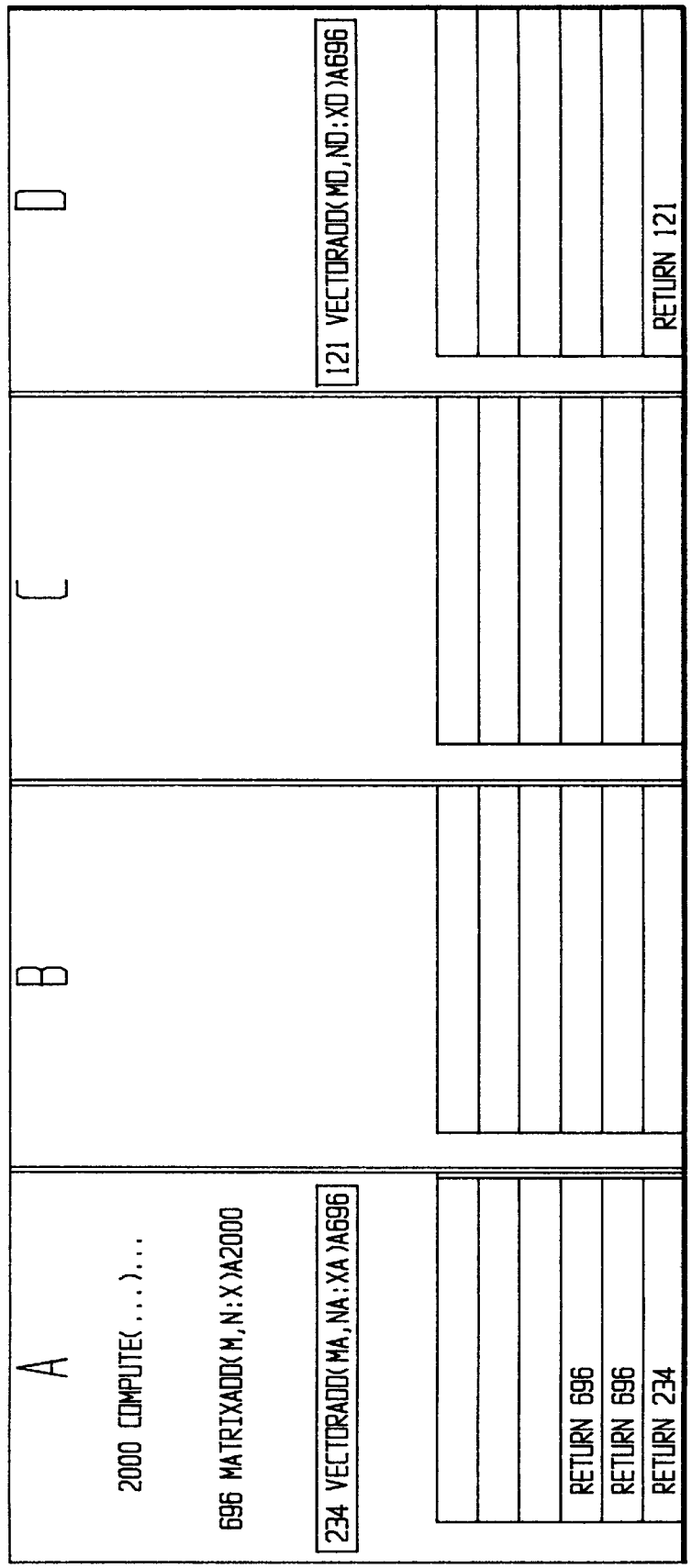

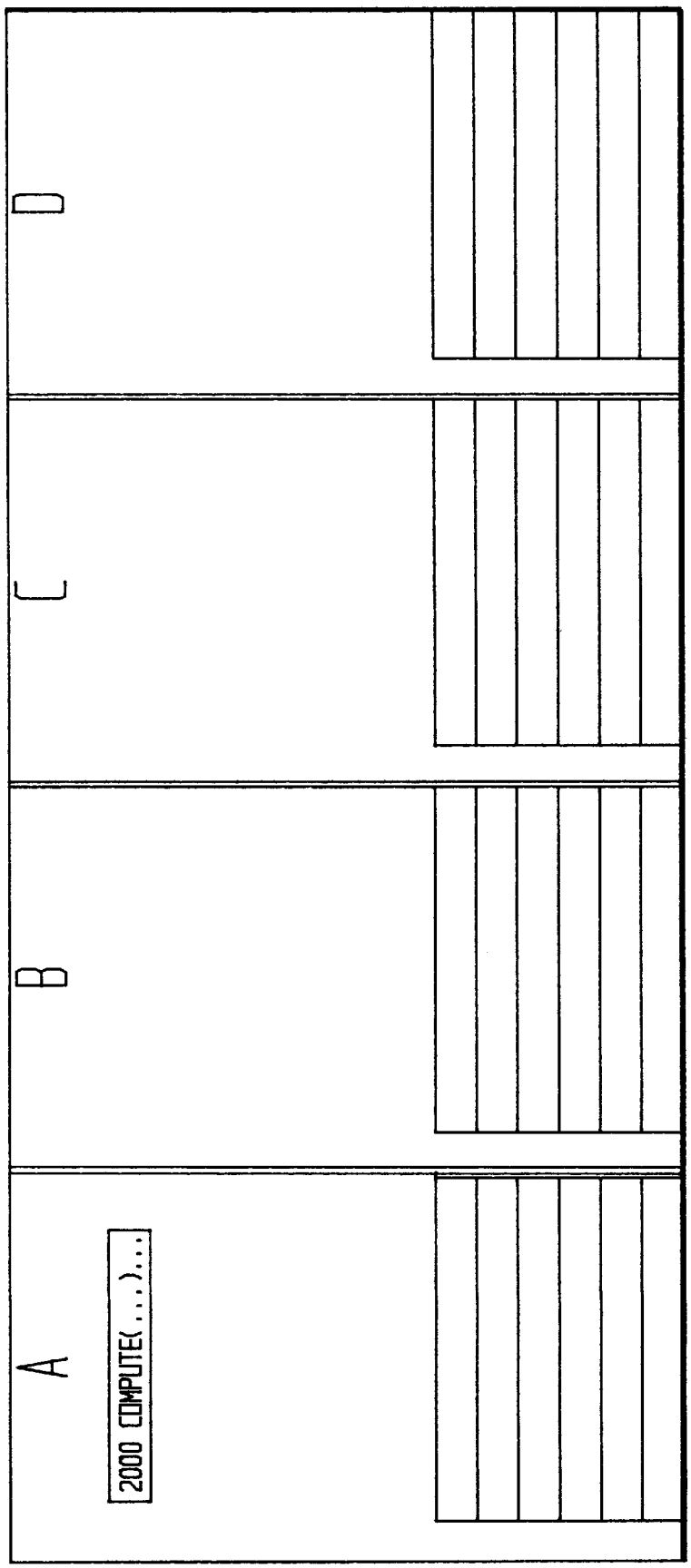

INVOCATION ARCHITECTURE FOR GENERALLY CONCURRENT PROCESS RESOLUTION

This application is a Continuation-In-Part of U.S. application Ser. No. 08/296,809 filed Aug. 26, 1994, now U.S. Pat. No. 5,572,732, which is a continuation of Ser. No. 07/837,641, Feb. 14, 1992, now U.S. Pat. No. 5,355,496 which is hereby incorporated herein by reference.

BACKGROUND OF THE INVENTION

1. Field of the Invention

This invention relates to a multiprocessor computer architecture, and more particularly to an invocation architecture for generally concurrent process resolution.

2. Description of the Related Art

A number of computer architectures supporting concurrent processing have been proposed.

In one kind of concurrent architecture, programs are compiled for a known, fixed configuration of processors and memory. These static systems use knowledge about the configuration of the system on which they are to be executed in order to compile their programs. In other types of systems, a processor hierarchy designates one processor as a "master," on which a run-time operating system or kernel makes decisions as to which of the processor will execute parts of a process. Here again, the concurrency is predetermined in terms of location of execution and the programs are compiled accordingly.

Each of these systems suffers from drawbacks. Fixed configuration systems are unable to adapt to variations in existing programs and hardware. For example, a typical system has a fixed number of processors which is a power of two and which can only be increased by fixed numbers of processors. When a system is reconfigured, existing programs usually have to be re-compiled to take advantage of the new configurations.

None of the existing systems are able to provide for generally concurrent process resolution which can exploit as much expressed concurrency as possible while using available resources in a flexible, automatic, optimal and distributed manner. Such a generally concurrent architecture is desirable.

SUMMARY OF THE INVENTION

Disclosed here is an invocation architecture for generally concurrent process resolution comprising a plurality of interconnected processors, some of the processors being homogeneous processors and others of the processors being special purpose processors. Each homogeneous processor is capable of invoking a connected processor to have the connected processor resolve processes. Each processor is capable of being invoked by a connected processor to resolve processes.

Program instructions defining potential processes and starting data are broadcast to all processors. The preferred programming language, referred to as the "Invocation Language"™, is described in U.S. Pat. No. 5,355,496, which is incorporated here by reference. The Invocation Language™ expresses processes purely in terms of association relationships among places in the symbol strings used to express processes.

One processor, which may be any processor, initiates a process at a high level when it receives an "invocation," which is a message, preferably of a prescribed form described below, naming the root processes. When the root process is susceptible of being divided into concurrently executable sub-processes, the initiating processor sends invocations for the sub-processes to neighbor processors.

Sub-processes are resolved in the same manner as the root processes. Whenever a sub-process is susceptible of being divided into concurrently executable sub-processes, the processor sends invocations to neighbor processors. Sub-processes further divide into lower-level processes, and unfold throughout the network as higher-level processes spawn lower-level invocations to neighbor processors.

In their preferred form, invocations include pointers to address data, pointers to address where results should be returned, and pointers to address where program instructions defining the process (or sub-process) can be found. Pointers in an invocation contain all the information necessary for the process or sub-process to go forward, and the very creation of an invocation causes the process to go forward. Control over execution of the process is determined by when and where invocations are formed, which is accomplished in a general and distributed manner.

The invocation architecture provides an environment for the creation and resolution of invocations. In preferred embodiments of the present invention, each of the plurality of processors comprises an activity agent (for example, CPU), an ALU and a plurality of special purpose memories local to the activity agent. One special purpose memory, a result data cache, is used to transfer process results from the activity agent to a result memory, which is shared by all processors. Another special purpose memory, a possibility expression and input data memory, receives and stores data and process definitions (executable instructions), through a broadcast bus. Other memories include an input buffer and an output buffer, which connect to adjacent processors and are used to exchange invocations.

In some embodiments, the invocation architecture further includes a plurality of input/output controllers. The input/output controllers may include a disk controller, a tape controller, a printer controller, and a communications controller. A first global bus connects each of the homogeneous processors to each of the plurality of input/output controllers.

In some embodiments, the invocation architecture further includes a plurality of special purpose processors. The special purpose processors may include a vector processor, a string processor, a logic processor, and a database processor. A second global bus connects each of the homogeneous processors to each of the special purpose processors.

The invocation architecture described herein is capable of resolving concurrent processes by exploiting as much of the expressed concurrency as possible. The invocation architecture of the present invention is indefinitely and benignly evolvable. That is, a new general purpose processor may be added to the system, and processes will self-distribute to the newly added processor. All that is needed is that neighbors of the new processor be notified of the existence of the new processor as a neighbor. Each new processor is a neighbor to some other processors and can be invoked by its neighboring processors.

BRIEF DESCRIPTION OF THE DRAWINGS

The invention will be described below with reference to attached drawings in which.

DETAILED DESCRIPTION OF THE PREFERRED EMBODIMENTS

Figure 1:
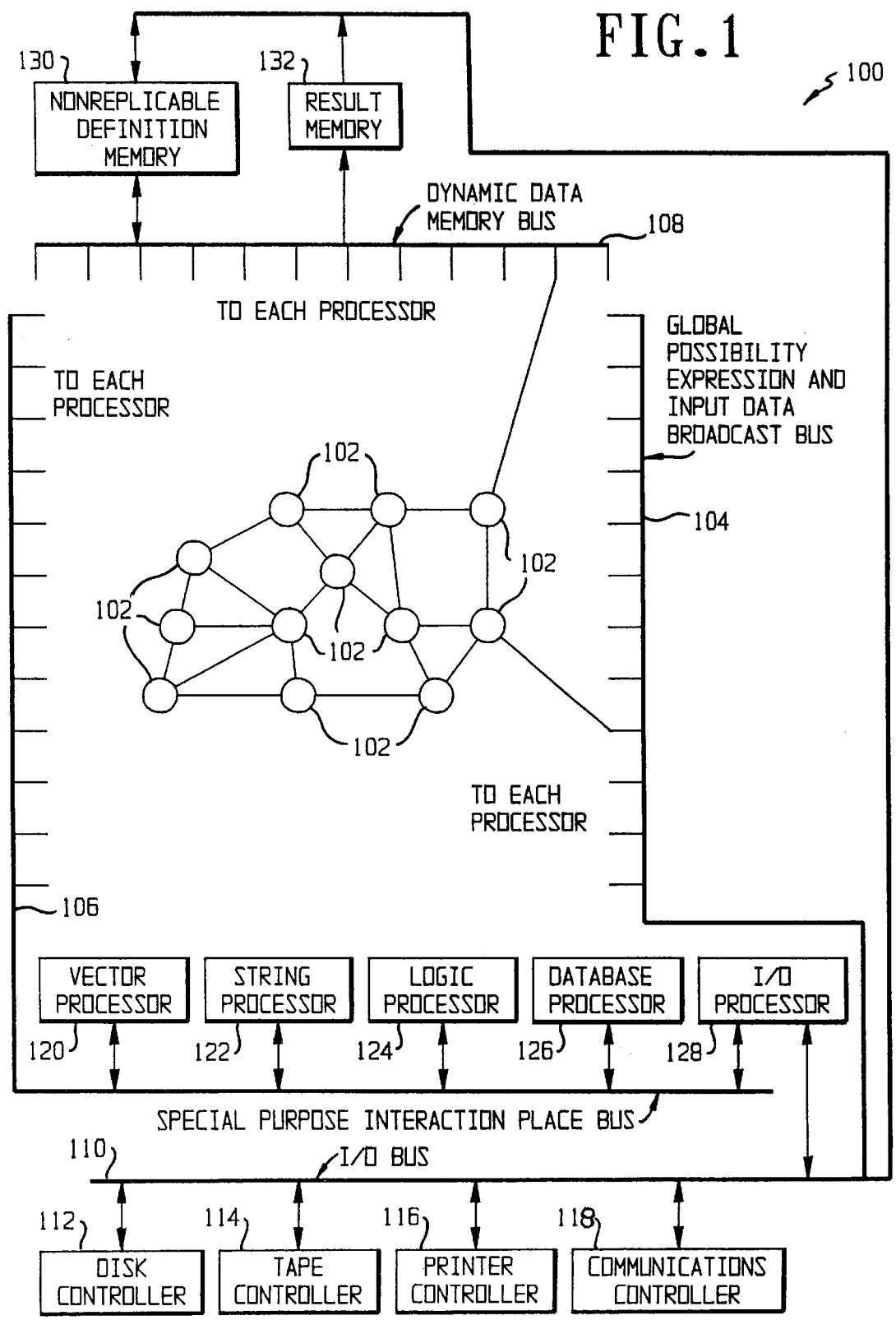
FIG. 1 depicts a configuration of the invocation architecture of the present invention.

With reference to FIG. 1, the invocation architecture 100 of the present invention consists of a network of local neighbor-connected, general purpose processors 102. There are no restrictions on interconnection topology, except that each processor must be connected to at least one other processor in the network. Preferably, each processor is connected to at least two neighbors, and the ability to provide concurrent operations is improved as the number of interconnections increases. Full cross-interconnectivity (where every processor directly connects to every other processor) is not required.

Each processor 102 may be a stand-alone work-station with CPU and local storage operating under control of a multi-tasking operating system. The architecture is flexible, however, and computing capability may be scaled to include increased capability (for example, as future costs of computing decrease) or decreased capability (for example, for economy). Each processor could be implemented as a separate circuit card within a chassis, or as a separate integrated circuit chip, or as separate stand-alone chassis connected through a local area network. Each general purpose processor also connects to certain shared resources through three global buses 104, 106, 108.

The first of these global busses, "global possibility expression and input data broadcast bus" 104 (also referred to as the "broadcast bus") connects each of the processors 102 to various input/output controllers (112–118). The input/output controllers may include a disk controller 112, a tape controller 114, a printer controller 116, a communications controller 118 and the like. The broadcast bus 104 delivers input data and potential process expressions to all of the processors 102. As will be discussed more fully below, a common set of program instructions will be broadcast simultaneously to all general purpose processors 102 through the broadcast bus during initialization.

The second bus, the "special purpose interaction place (SPIP)" bus 106, is a global bus connecting each processor 102 to a set of special purpose processors 120–128, effectively making each special purpose processor 120–128 a neighbor of each of general purpose processor 102. The special purpose processors include, for example, vector processor 120, string processor 122, logic processor 124, database processor 126, and I/O processor 128. I/O processor 128 is also connected, via I/O bus 110, to the various device controllers 112–118. These special purpose processors allow for further performance enhancement. Because it cannot be predicted in advance which general processor 102 will encounter an invocation for a specialized operation requiring a special purpose processor, there is complete connectivity between the general processors 102 and the special purpose processors. That is, each general processor 102 preferably is connected to each special purpose processor 120–128 via SPIP bus 106.

A third global bus, the "dynamic data memory" bus 108, connects each of various shared memories 130 and 132 to each processor 102. The shared memories include non-replicable definition memory 130 and result memory 132. As will be discussed more fully below, each general purpose processor deposits partial results in the result memory 132, and uses the non-replicable definition memory 130 to store certain shared data structures, such as a map of available result memory and global data variables. The dynamic data memory bus 108 is serialized so that only one processor at time has access to non-replicable definition memory. This bus can be arranged to provide test and set access if semaphore-like coordination is ever required among the processors.

Except for certain special attributes, which are discussed below, components of the invocation architecture may be of conventional design.

Figure 2:
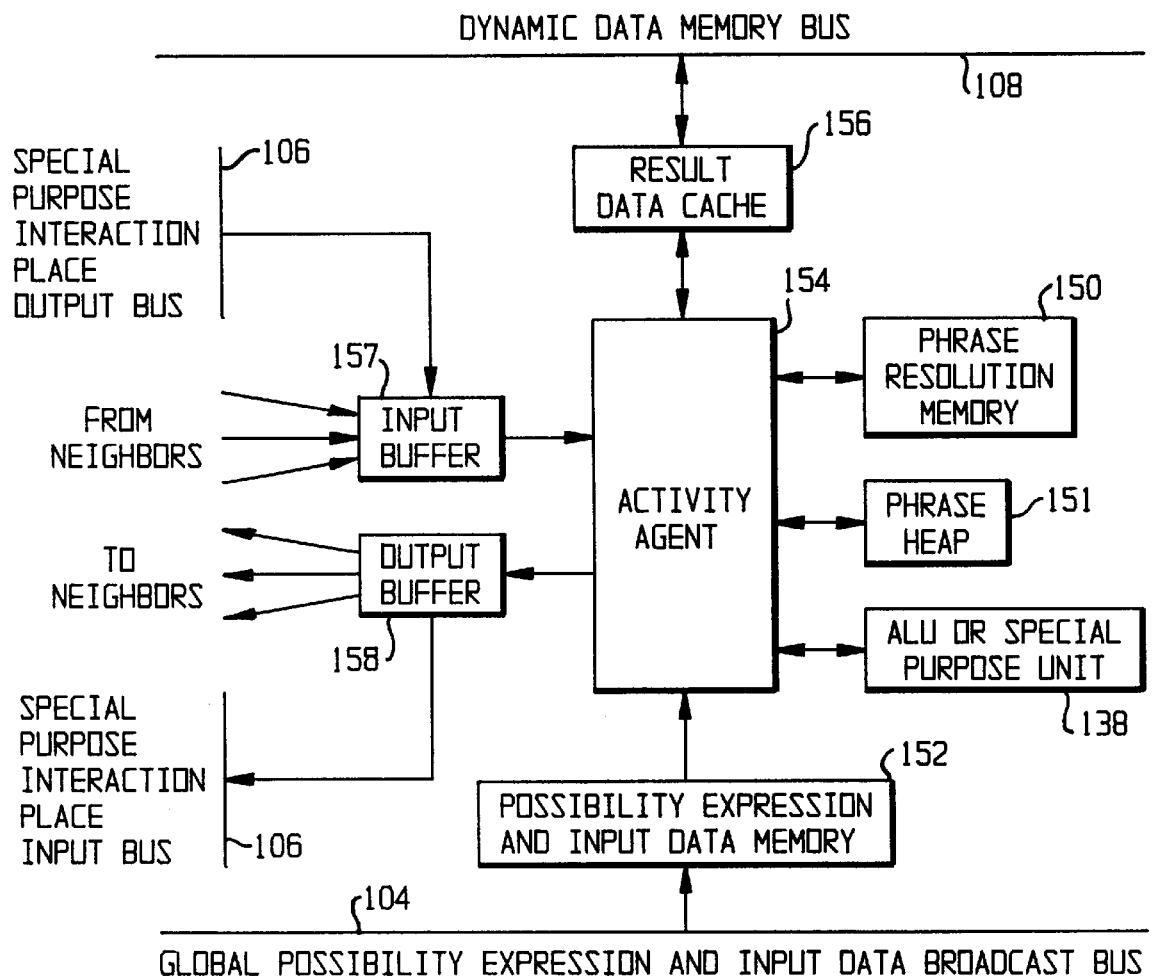
FIG. 2 shows the structure of a processor of the invocation architecture of FIG. 1.

With reference to FIG. 2, each general purpose processor 102 is organized around an "activity agent" 154, which is contemplated to be a conventional central processing unit ("CPU"), with associated memory and interface circuitry, and operating under control of a local, multi-tasking operating system. Each processor further includes an associated arithmetic logic unit ("ALU") 138 or special purpose arithmetic unit. Activity agent 154 and ALU 138 could include an off-the-shelf CPU/math-co-processor pair. All activity agents may use an identical operating system, which controls the local environment.

Several special-usage memories are defined for the activity agent 154. These memories may be allocated portions of the activity agent's system memory.

"Possibility expression and input data memory" 152 receives "possibility expressions" and starting data that are broadcast through the broadcast bus 104 during initialization. As will be discussed below, possibility expressions are program instructions which partially express potential processes.

A phrase resolution 150 memory is a working storage area into which possibility expressions are copied when active. A phrase heap 151 stores invocations from neighbor processors. As will be discussed below, invocations are messages which define processes.

Result data cache 156 provides temporary storage for partial results of processes, which ultimately are transferred to result memory 132 (FIG. 1) through dynamic data memory bus 108 (FIG. 1).

Each processor 102 further includes input and output buffers 157, 158 which are used to exchange invocations with neighbor processors. Processors do not use interrupts for invoking neighbors or reporting resolution (although processors may use interrupts for servicing hardware in its local environment). Each processor's resolution activity is determined by the contents of its respective phrase heap, although processors may perform overhead operations dictated by its local operating system after resolving a first invocation and before beginning to resolve a next invocation.

THE INVOCATION MODEL OF PROCESS EXPRESSION

The invocation architecture is especially well suited to performing processes having their concurrency expressed according to the invocation language and the invocation model of process expression as described in U.S. Pat. Nos. 5,305,463 ("Null Convention Logic System") and 5,355,496 ("Method and System for Process Expression and Resolution Including a Generally and Inherently Concurrent Computer Language"), which are incorporated herein by reference.

U.S. Pat. No. 5,355,496 describes an invocation language for general symbolic processing. This invocation language is able to express the possible concurrency within any process with full generality and in a straight forward manner, thereby exploiting concurrency in symbolic processing. The invocation language expresses processes in terms of expressions of unitary operations (independently procedable or concurrently procedable units of expression). The processors of the invocation architecture will be programmed preferably in accordance with programming techniques of an invocation language.

The techniques of the invocation language are based on an invocation model of process expression. A more complete explanation of the invocation model can be found in U.S. Pat. No. 5,305,463. For convenience, certain aspects are repeated here.

PROCESS DEFINITION

A process, in a general sense, is an interaction between entities. One central aspect of the invocation model is that processes can be modeled as two parts: a "possibility" and an "actuality." The "possibility" is the interaction, separate and apart from the entities involved in the interaction. An "actuality" is an entity involved in an interaction, separate and apart from the interaction itself. A specific combination of a possibility with an actuality is a specific instance of a process, and is referred to as an "actualization" of the process.

For example, mathematical operations and logic truth tables are examples of possibilities, while operands (for example, numbers) are examples of actualities. More specifically, addition is a "possibility," while numbers are "actualities." These terms are suggestive of the observation that an interaction (possibility, for example, addition) typically has multiple possible operands (actualities, for example, numbers), and the precise outcome of an specific instance of addition depends on the specific entities (actual numbers) involved in any specific instance of the process. Addition, per se, is not a process which can go forward without numbers, while numbers are not processes which can go forward without identifying the mathematical operation.

In the context of this invocation architecture, possibilities and actualities are expressed as data strings, referred to as "possibility expressions" and "actuality expressions." An actualization of a process has a name, also called an "invocation," which is a string combining a possibility expression and an actuality expression. The possibility "addition," for example may have a possibility expression "PLUS." The actualities "one" and "two" (numbers) may have actuality expressions "1" and "2." The actualization of the process of adding together the numbers one and two may have an invocation "PLUS(1, 2)," which combines a possibility expression with specific actuality expressions.

PROCESS RESOLUTION UPON NAME FORMATION

In a sense, the possibilities correspond to transactions, functions or procedures, and the actualities correspond to parameters, or, more specifically, to actual parameters. In these terms, the invocation architecture performs a process when an invocation is formed by strings defining a possibility (procedures) and actualities (actual parameters).

Invocations in the invocation architecture are functional, not arbitrary. An invocation is an expression that contains necessary and sufficient information for the process to proceed. The creation of an invocation is referred to as "invoking" the process. Carrying out the process associated with the invocation is referred to here as "resolving the invocation." Typically, the result of a process is another actuality expression.

Using the example of integer addition above, the formation of the invocation "PLUS(1, 2)" is necessary and sufficient to cause (or allow) the process (of adding integers 1 and 2) to go forward. Resolution of the invocation "PLUS(1, 2)" generates a new actuality expression (in this case "3") which potentially joins with a possibility expression to invoke a new process.

The invocation architecture provides an environment in which invocations are automatically resolved when formed. The very existence of a complete invocation is the triggering event in the invocation architecture which causes a process to go forward. A process begins when a first possibility expression is joined with a first actuality expression. The resultant invocation immediately resolves. During resolution, additional invocations may be formed which themselves resolve as sub-processes within hierarchies of processes. Typically, the result of a process is a new actuality expression, which then can join with another possibility expression to invoke a new process, etc.

The example of addition described above is a simplistic illustration used to provide an intuitive understanding of the philosophy of the invocation architecture. Applications of the invocation architecture utilize rules for expressing possibility expressions and actuality expressions so as to accomplish practical results. Possibility expressions are rule-based descriptions of transformations, while actuality expressions are descriptions of entities capable of being transformed.

RESOLVING CONCURRENT OPERATIONS

A central aspect of the invocation architecture is that, wherever possible, a process that can be performed as concurrent sub-processes is divided, and the sub-processes are resolved independently. This is accomplished by taking advantage of the way in which possibility expressions are defined, and by utilizing the invocation-resolution characteristics of the invocation architecture.

A process may be composed of sub-parts, each of which is itself a process. As a process is broken down into sub-processes, and sub-processes are broken down even further in a recursive manner, a lower limit is ultimately reached below which it is either infeasible or unnecessary to further divide a process. A process which is capable of being performed without reference to a higher level process is referred to here as a "unitary operation."

For example, the process of adding two matrices can be broken down into sub-processes of adding vectors. Each sub-process of adding vectors can be broken down into lower-level process of adding integers. The process of adding integers may itself be broken down into even lower level processes of adding digits.

Unitary operations can exist at any level. For example, once the process of matrix has been broken down into separate vector addition processes, each vector addition can proceed independently. Similarly, after each vector addition process has been broken down into separate integer addition processes, each integer addition can proceed independently. Matrix addition, vector addition, and integer addition each is a unitary operation.

It should be understood that a possibility in the invocation architecture is expressed as executable software instructions stored in the possibility expression memory (item 152, FIG. 2). Dependencies between unitary operations and sub-operations are expressed in the routines for the possibility expressions. Wherever practicable, the program code that expresses a possibility is written to divide the process into concurrent sub-parts. When such a possibility expression combines with an actuality expression (that is, when an invocation is formed and begins resolution), the program code for the possibility expression operates on the data of the actuality expression, and in so doing may form invocations of sub-operations. The processor resolving the higher-level invocation forms invocations of concurrent sub-processes and transmits these invocations to adjacent processors. The adjacent processors then resolve their respective invoked sub-processes, and return results to the initiating processor. The processor that transmits an invocation may also maintain a record that a particular invocation was sent to a particular neighbor, thus allowing recreation of threads of activity for fault recovery.

Where the number of concurrent sub-processes is large, the initiating processor may keep one sub-process for itself to resolve, and spawn the remainder off to its neighbors. If sub-operations must be completed before a root operation can be completed, the processor resolving the root operation suspends the root operation. When processors are implemented with multi-tasking operating systems, each process, sub-process, etc. may be controlled as a separate task.

Resolution of a unitary sub-operation proceeds in the same manner as for the root operation. The processor receiving the sub-operation forms invocations of lower-level operations, or actuality expressions if the lowest level operation has been completed. As unitary operations are completed, processors return results to neighbors from which the invocation was received. There, they combine with suspended possibility expressions to form new invocations.

The collection of sub-operations may be thought of as a resolution tree, with a root operation spawning one or more sub-operations, and each sub-operation in turn spawning one or more lower level operations, etc. As new operations are invoked, the state tree grows. As unitary operations are resolved, the state tree shrinks. The resolved unitary operations may spur the invocation of further concurrent unitary operations and the tree grows again. Thus, the state tree representing the proliferating invocations of sub-operations of the process grows and shrinks as the process is executed. When the final branch shrinks back into the root node of the resolution tree, the resolution of the root process is complete.

The invocation architecture exploits concurrency in an efficient manner by pre-delivering resources to the processors. During initiation, the same possibility expressions and initial data are delivered to all processors. Invocations supply means to access the resources and deliver results (for example, address pointers) and authority to proceed (the existence of the invocation itself). The overhead associated with invoking neighbor processors is thus minimized.

STATE TREE REPRESENTATION OF PROCESS RESOLUTION

Figure 3:
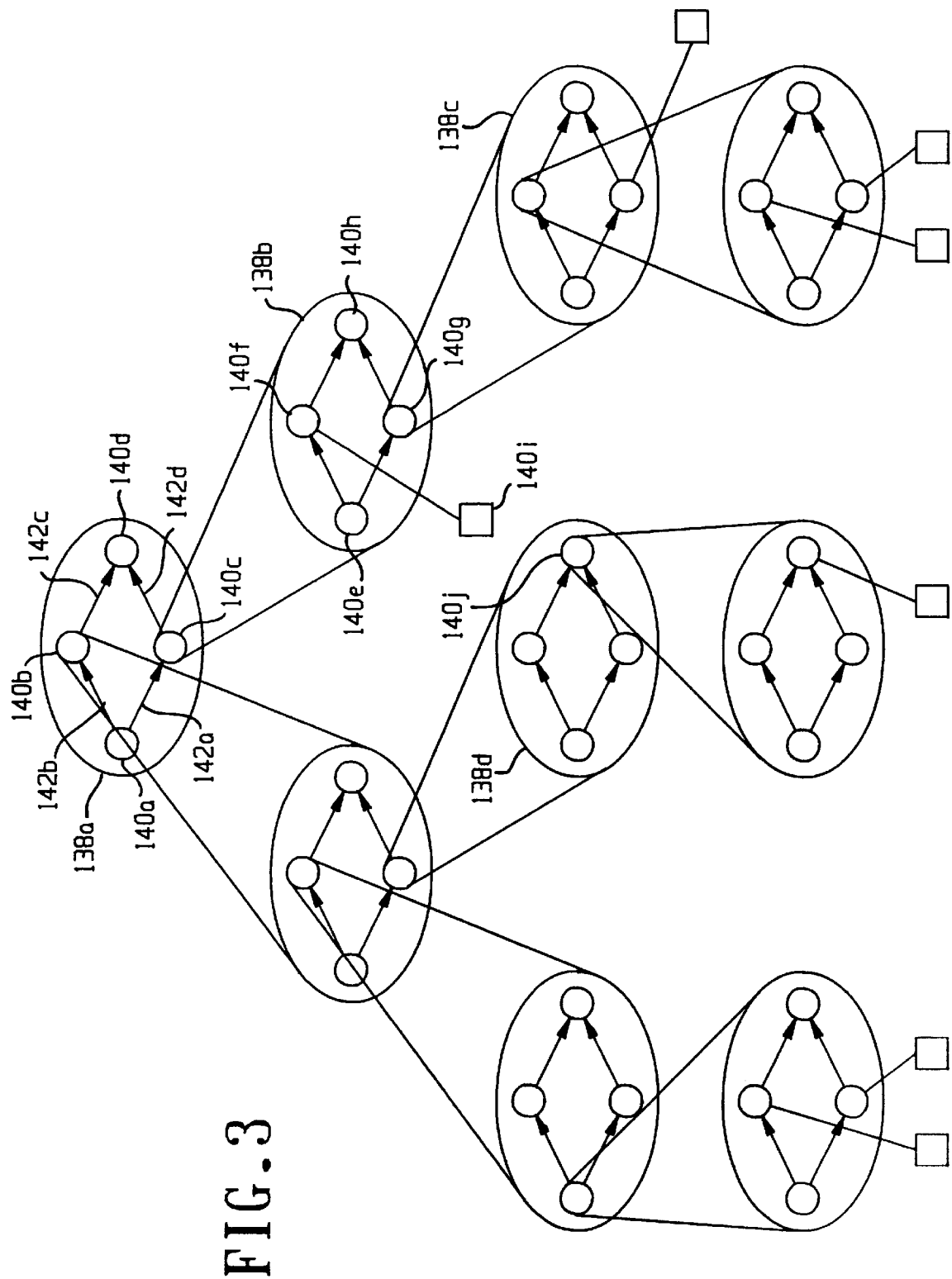
FIG. 3 is a snapshot of a resolution tree of a concurrent process on the invocation architecture of the present invention.

FIG. 3 is a snapshot of a resolution tree of concurrent processes on the invocation architecture of the present invention.

The root process is designated as an oval 138a. Within the oval 138a is a set of circles and arrows. A first circle 140a represents a first sub-operation of the root process. Second and third circles 140b, 140c represent concurrent sub-operations. Arrows 142a, 142b indicate that, after completing the first sub-operation, the root operation can be divided into two concurrent sub-operations, 140b, 140c. Fourth circle 140d represents a fourth sub-operation that must wait for results from the concurrent operations 140b, 140c.

When an initiating processor of the invocation architecture receives the root invocation for the operation represented by oval 138a, the processor forms the invocation of the first sub-operation 140a and may immediately executes it (because it is not divisible). The processor then forms the invocations of the two unitary sub-operations 140b, 140c and transmits the fully formed invocations to adjacent processors. The initiating processor then suspends resolution of root operation. When the results of the concurrent sub-operations are returned, the processor forms the invocation of the fourth operation 140d.

One of the concurrent sub-operations 140e is illustrated in more detail as an oval 138b. Within the oval 138b, circle 140e represents a first sub-operation. Second and third circles 140f, 140g represent concurrent sub-operations, and circle 140h represents a fourth sub-operation that must await results from the concurrent sub-operations. As with the root process, when a receiving processor receives the fully formed invocation for the sub-operation, the processor either executes them immediately or forms the invocations of sub-operations and transmits them to adjacent processors. In this case, one of the sub-operations 140f is concurrent to operation 140g, but 140f is not further divisible into lower-level sub-operations and is designated by a square. The processor receiving the invocation of sub-process 140g will resolve the process and return the result.

In general, each sub-operation is resolved in a like manner, with a receiving processor responding to a fully formed invocation by forming invocations of lower-level sub-operations, resolving immediately indivisible sub-operations, and suspending the higher-level operation until lower-level operations have returned results. It should be noted that the result of a sub-operation may itself be a fully formed invocation of a divisible sub-operation, as depicted as sub-operation 140j within oval 138d.

When a suspended sub-operation, such as sub-operation 138b, receives a result from lower level operation 138c, suspended sub-operation 138b revives to complete resolution and return the result to root-operation 138a. Root operation 138a then completes its fourth process 140d, and the root operation is complete.

MATRIX ADDITION EXAMPLE

An example of process resolution in the invocation architecture will be given by explaining the addition of two matrices. Two matrices having the same dimensions are added by adding their corresponding elements. Matrix addition can also be viewed as vector addition of the corresponding rows (or columns) of the matrices.

Figure 4:
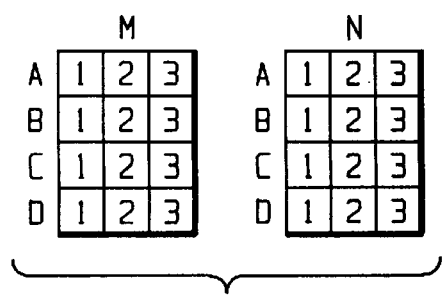
FIG. 4 shows two matrices used in examples in this description.

FIG. 4 illustrates two matrices M and N each having four rows and three columns. Addition of the matrices can be performed by vector addition on each of the rows of M and N.

Figure 5:
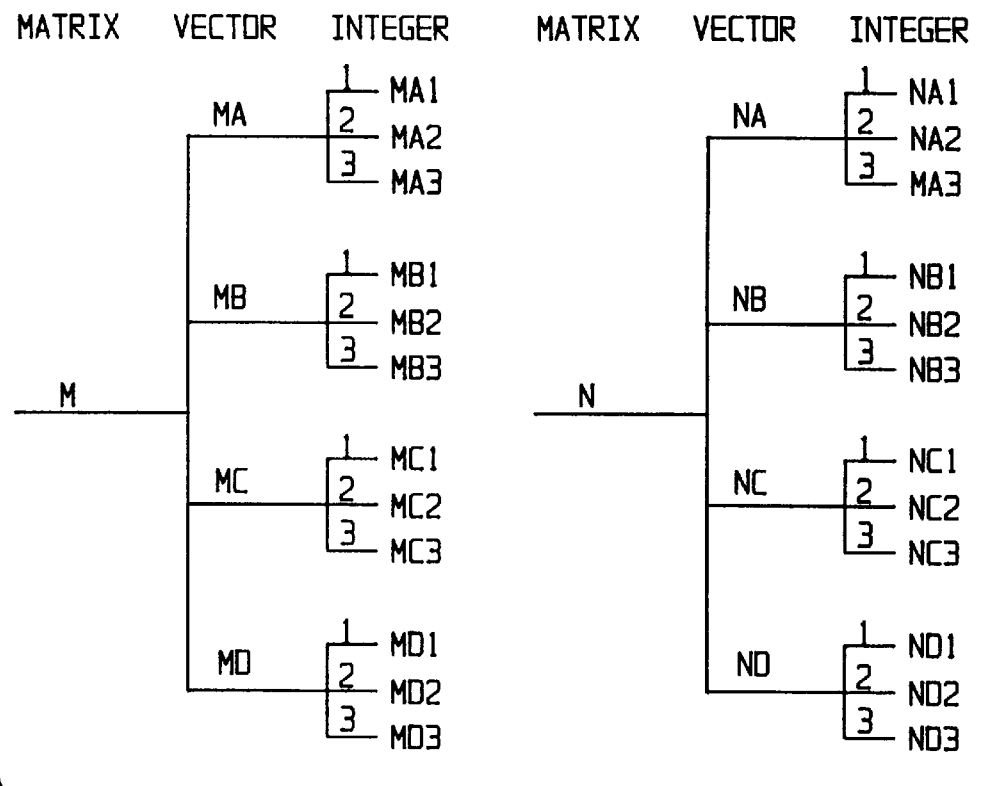
FIG. 5 shows a decomposition structure of the two matrices of FIG. 4.

FIG. 5 shows a decomposition of each of the matrices M and N into four row vectors A, B, C, and D. The actual integer value in each position in each of the matrices is named according to its matrix row and column, for example, MA1, MA2, etc. For each of the element names in each matrix, the actuality expression is the value in that position in the matrix. Thus, for MA1, the actuality expression is "1".

Figure 6:
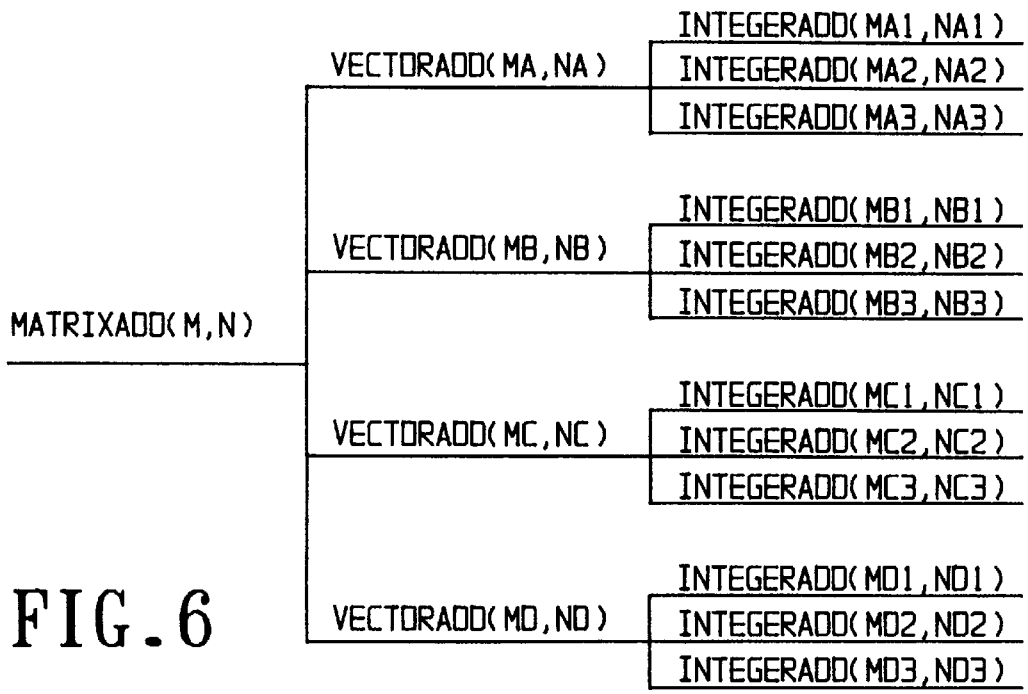
FIG. 6 shows the invocation progression from the decomposition structure of FIG. 5.

With reference to FIG. 6, the process of adding the two matrices M and N can be expressed by forming an invocation made up of the possibility expression MATRIXADD and the actuality expressions M and N. The possibility expression MATRIXADD, in turn, can be expressed in terms of sub-operation VECTORADD, which itself can be expressed in terms of sub-operations, the expressions INTEGERADD.

Given two matrices with the structure (and decomposition) described above, the addition of the matrices M, N is achieved by invoking the invocation "MATRIXADD(M, N)". This invocation names the root operation for this process. As noted above, resolution includes the invocation of unitary sub-operations. In this case, the root operation invokes four unitary sub-operations "VECTORADD(MA, NA)", "VECTORADD(MB, NB)", "VECTORADD(MC, NC)", and "VECTORADD(MD, ND)".

Each of the vector addition sub-operations can itself be divided into sub-operations. For example, the sub-operation VECTORADD(MA,NA) to add corresponding rows of the two matrices is divisible into three lower-level unitary sub-operations INTEGERADD(MA1,NA1), INTEGERADD(MA2,NA2), INTEGERADD(MA2,NA2).

The integer addition INTEGERADD is a possibility expression, the resolution of which requires the actual values of the elements. Note that during resolution the vector addition sub-operations must wait for the resolution of their integer addition sub-operations before continuing.

Figure 7:
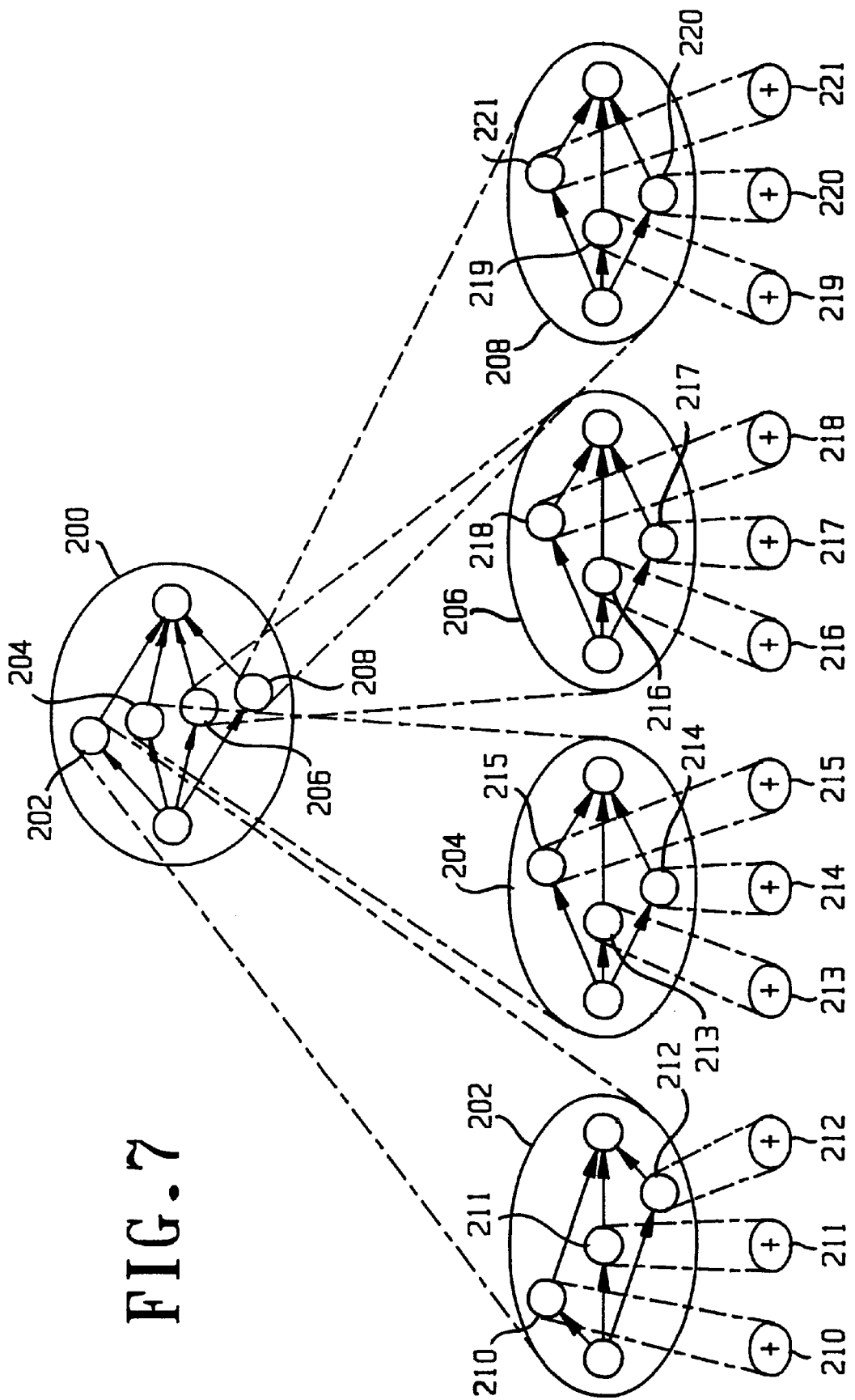
FIG. 7 depicts a snapshot of a resolution tree during the evaluation of the matrix addition of the two matrices in FIG. 4 according to the decomposition of FIG. 6.

FIG. 7 depicts a snapshot of a resolution tree during the evaluation of the process named "MATRIXADD(M, N)." The root invocation "MATRIXADD(M, N)" 200 spawns four concurrent vector additions 202, 204, 206, 208. The four vector additions together spawn twelve concurrent integer additions 210–221. Dependencies between the sub-unitary operations are provided by the arrows between them. For example, MATRIXADD(M, N) 200 depends on the results of the four VECTORADD processes 202–208. Sub-unitary operation VECTORADD(MA,NA) 202 depends on INTEGERADD processes 210–212, etc.

PROCESS RESOLUTION IN THE INVOCATION ARCHITECTURE

"Process expressions" are the set of possibility expressions and actuality expressions which together define the overall process. From this set of expressions, specific actualizations can be initiated by combining specific possibility expressions with specific actuality expressions to form invocations. The fundamental activity of the invocation architecture is resolving invocations.

Process expressions are mapped to internal expressions of, for example, coded pointer structures convenient for the various processors to resolve. For example, a possibility expression for an arithmetic operation may be mapped into an address where binary machine code can be found, and data may be mapped to address pointers where the binary values are stored. The mapping from external invocations to internal structures is not a compiler-like translation, but is instead a one-to-one assembler-like mapping (although the generation of machine code expressions from human-usable mnemonics may be by compiler). The internal coded pointer structures express the same association relationships among internal expression elements as the process expression.

EXAMPLE

Figure 8:
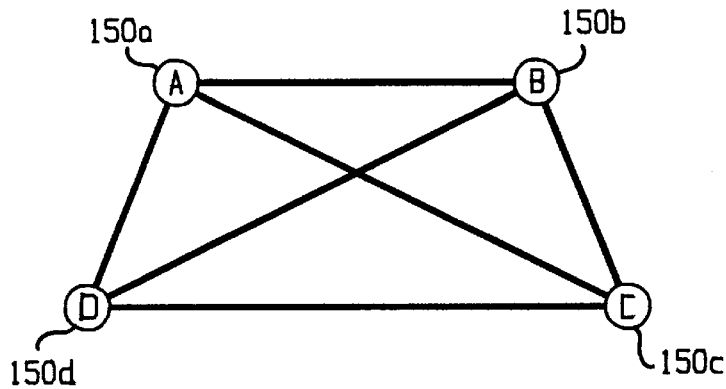
FIGS. 8, 9(a), 9(b) and 10(a), 10(b), 10(c), 10(d), 10(e), 10(f), 10(g), 10(h), 10(i), 10(j), 10(k), 10(l), 10(m), 10(n), 10(o), 10(p), 10(q), 10(r), 10(s), 10(t), 10(u), 10(v), 10(w), and 10(x) illustrate a worked example of the addition of two matrices of FIG. 4 on the invocation architecture of FIG. 1.

A further explanation of the matrix addition described above is presented with reference to FIGS. 8, 9(*a*), 9(*b*) and 10(*a*)–10(*w*). FIG. 8 illustrates four interconnected processors 150*a*, 150*b*, 150*c*, 150*d*. These four processors would occupy the locations of processors 102 in FIG. 1. This example assumes no special purpose processors. The resolution of MATRIXADD(M, N) is shown on four processors A, B, C, and D connected as shown in FIG. 8.

Figure 9A:
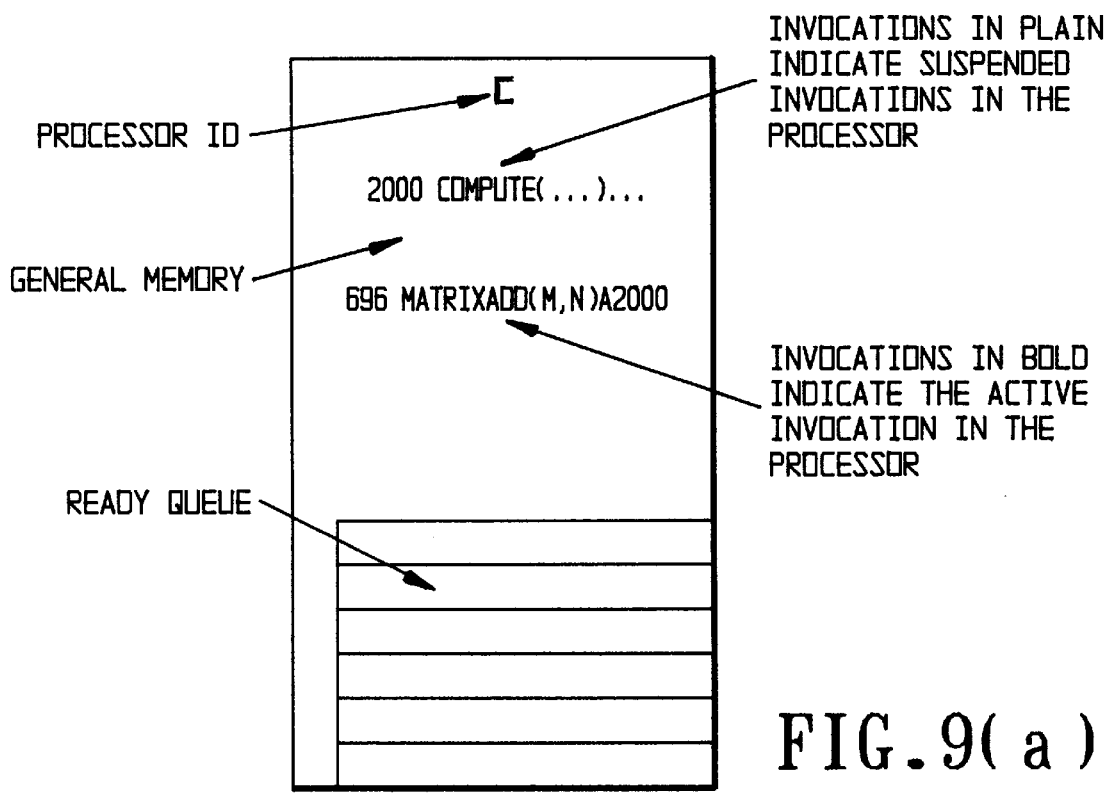
Figure 9B:
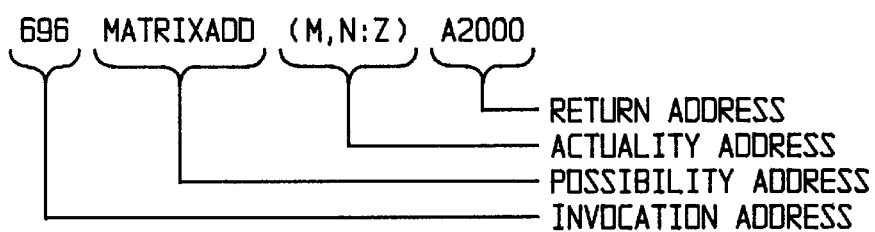
Figure 10A:
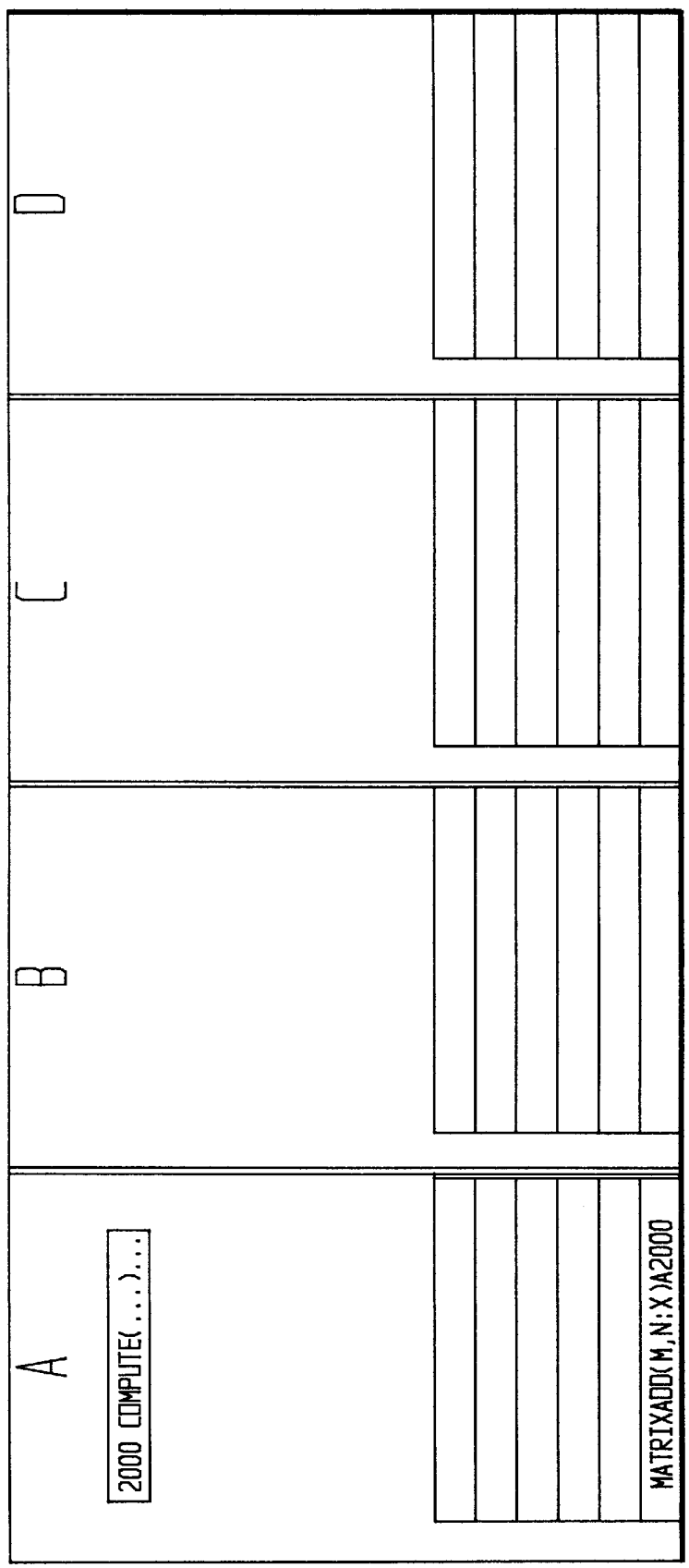
Figure 10D:
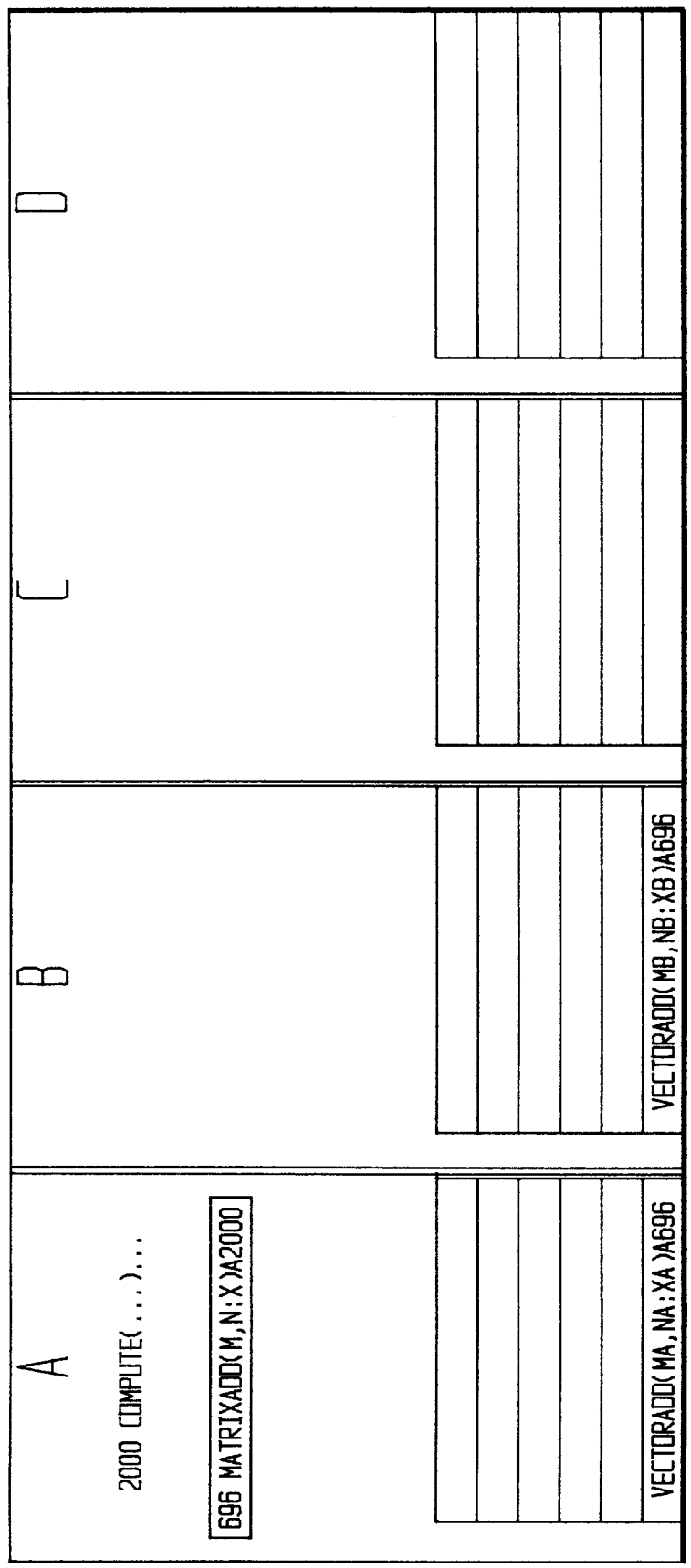
Figure 10F:
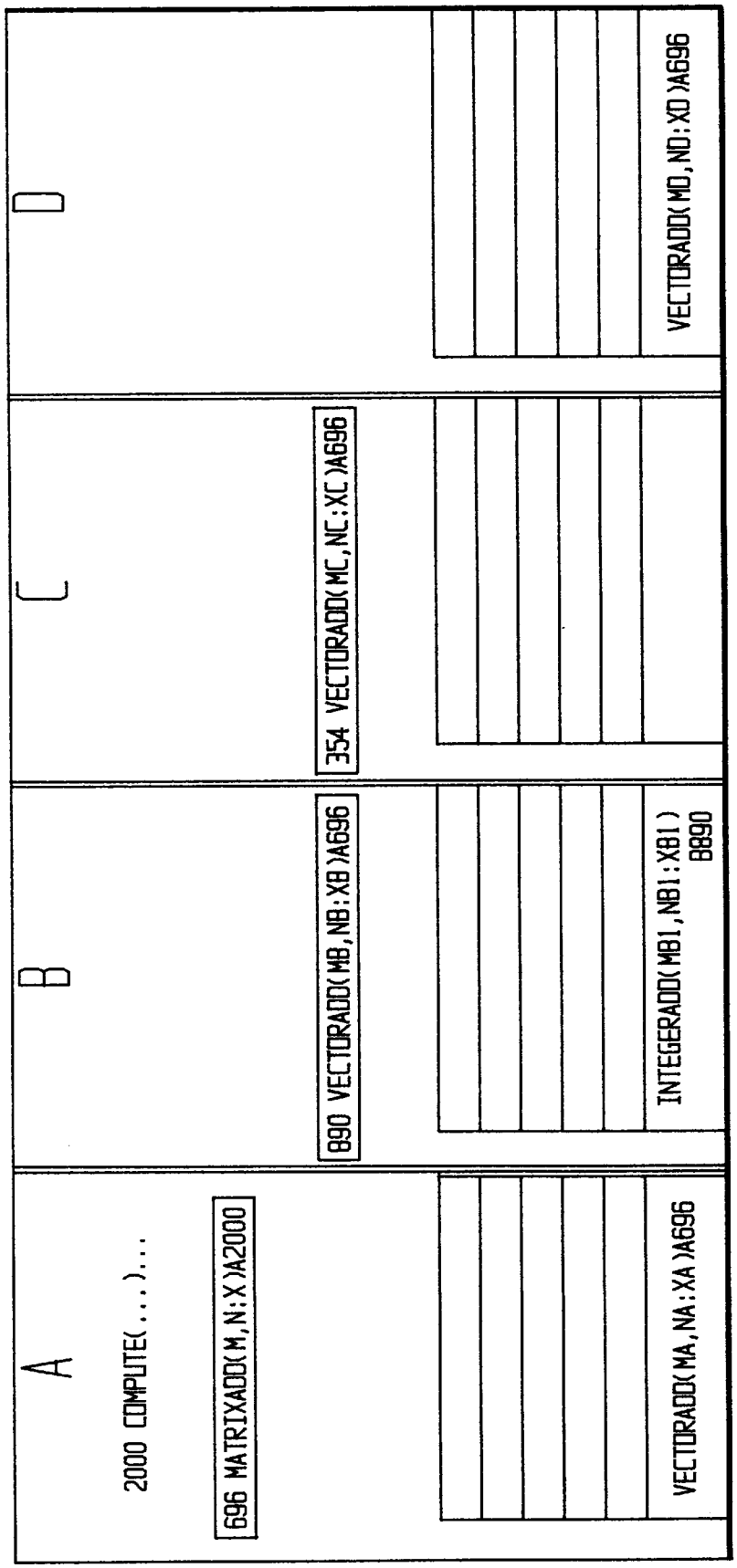
Figure 10H:
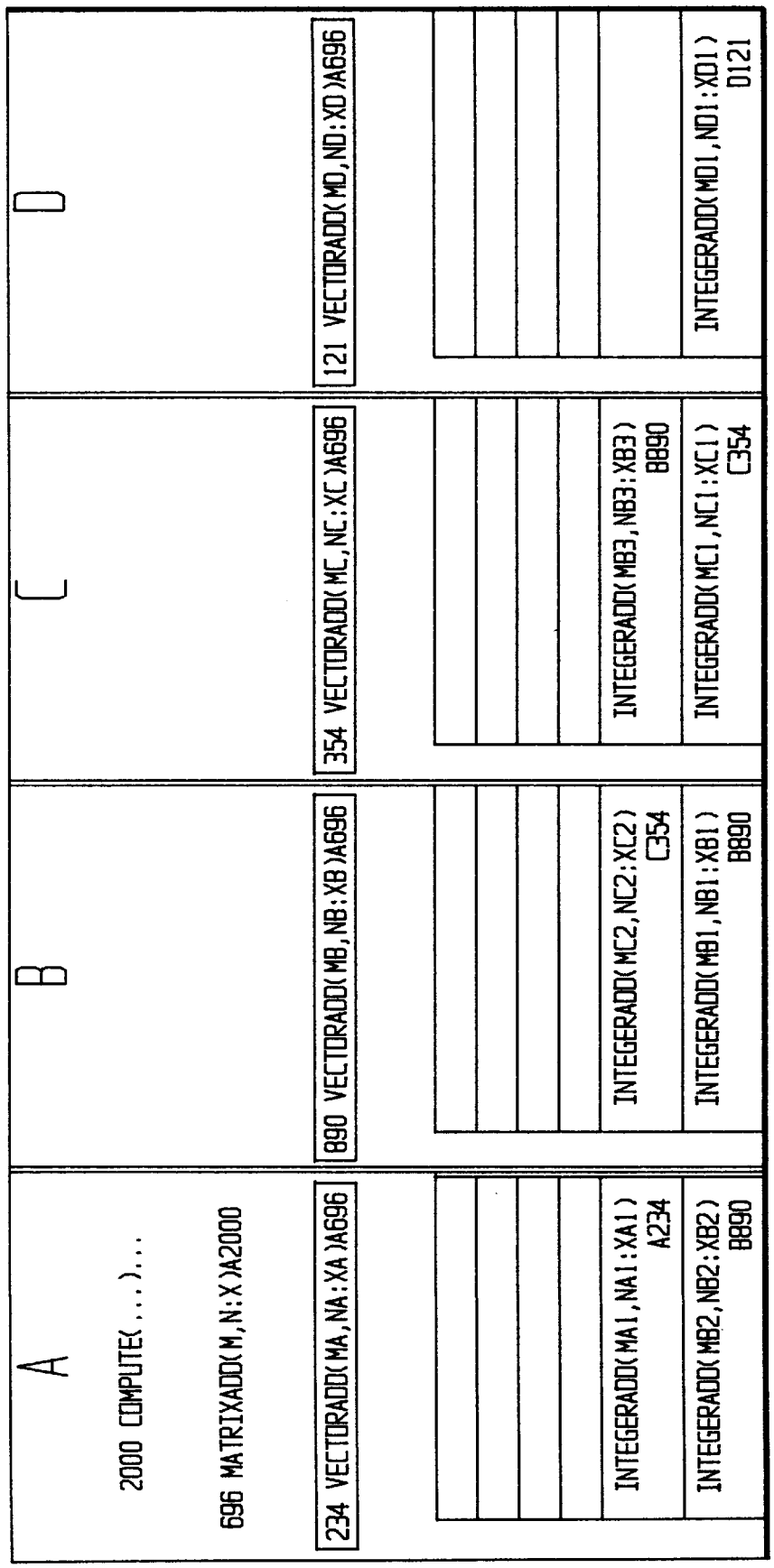
Figure 10K:
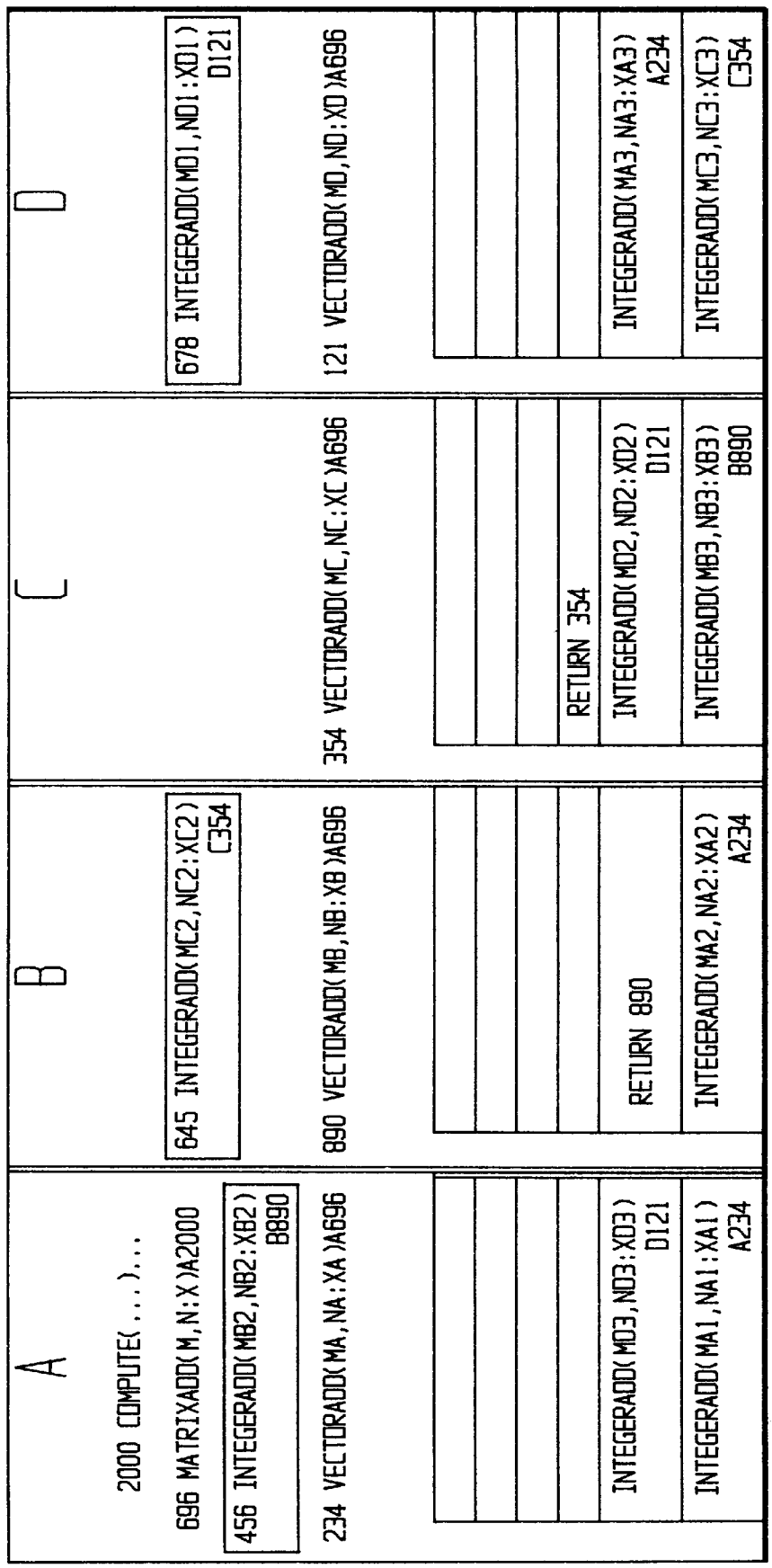
Figure 10:
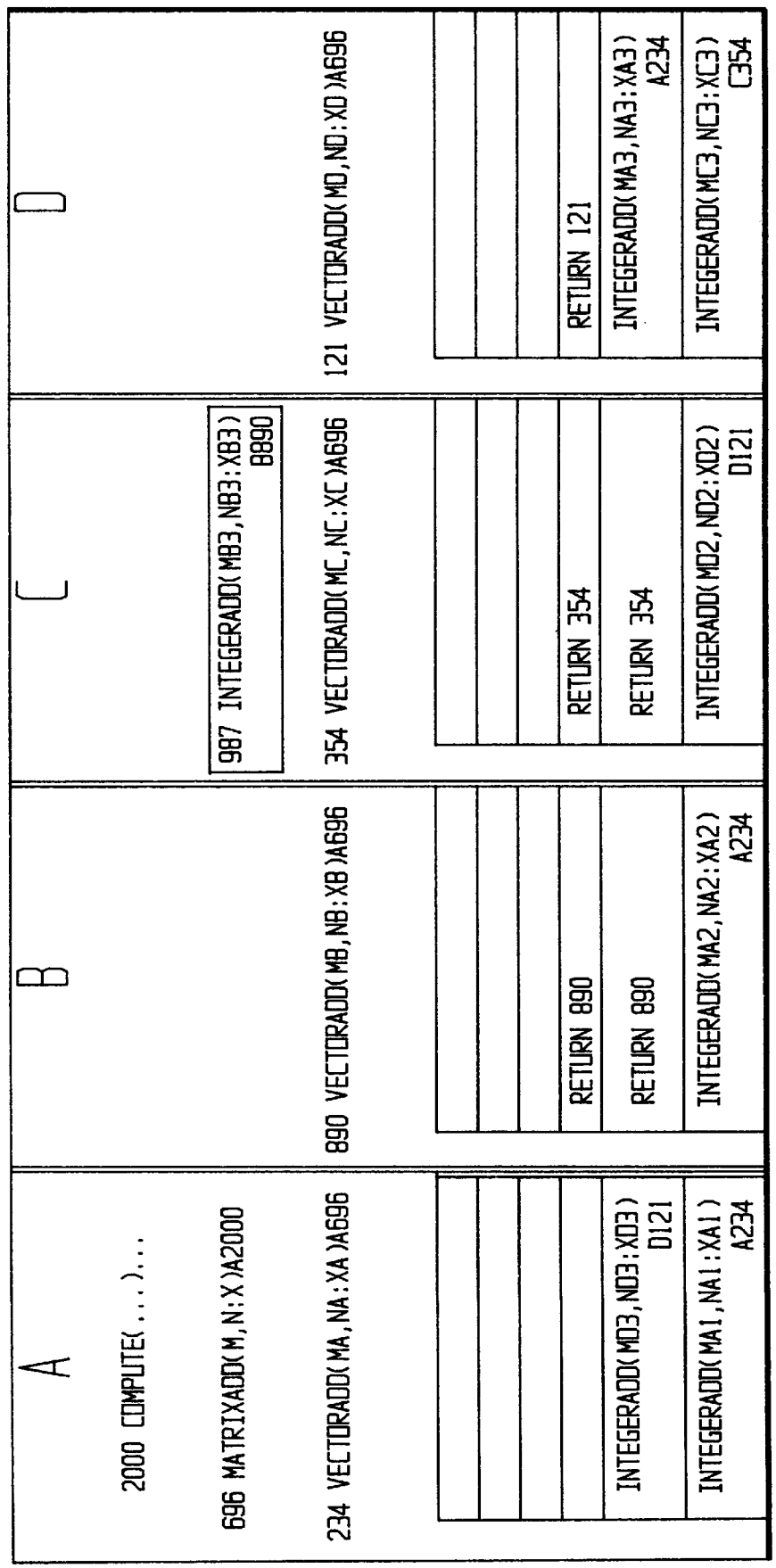

The elements and notations used in this example in FIGS. 10(*a*)–10(*w*) are shown in FIGS. 9(*a*) and 9(*b*). The state of each of the four processors A–D is represented by a rectangle with the processor identity (A, B, C, or D) in the top left corner. A Ready Queue of each processor, which corresponds to phrase heap 151 of FIG. 2, is shown in the lower right of the rectangle. In the General Memory of each processor, which corresponds to phrase resolution memory 150 of FIG. 2, invocations are shown in small, light text to indicate suspended invocations in that processor, while invocations shown in large, bold text indicate the active invocation in the processor.

It should be understood that during initiation, executable instructions for all possibility expressions are broadcast to all processors and loaded into identical addresses of each possibility expression memory (FIG. 2) of each processor. When a new invocation is withdrawn from a ready queue of a particular processor, the processor copies the executable code from its possibility expression memory 152 (FIG. 2), into its phrase resolution memory 150 (FIG. 2) and begins execution of the copied instructions.

The structure of an invocation is described with reference to FIG. 9(*b*). The first number (for example, 696) is an address identifying phrase resolution memory (150, FIG. 2) for the invoked process. This address may be assigned when a receiving processor begins resolution. The next field (for example, "MATRIXADD") is a string comprising the address (in possibility expression memory, 152, FIG. 2) of the executable instructions defining the possibility expression. The next field (for example, "M, N") is the address (or addresses), typically in possibility expression and input data memory, of the actuality expression (or expressions) for the process. This field may additionally include an address (for example, Z) in result memory (132, FIG. 2) where results are to be stored. The fourth field (for example, A2000) contains one or more pointers (addresses in general memory of the processor that spawned the invocation) of a return address (in the sending processor) where the receiving processor reports completion of the invoked sub-operation.

For ease of illustration, it will be assumed that each of FIGS. 10(*a*)–10(*w*) represents a snapshots of the states of processors A, B, C, D at sequential points in time. Resolution of the process is not synchronous, and time periods between snapshots may vary according to the tasks being performed. Furthermore, the illustration of two or more results taking place between figures should not be understood to imply that those results need to occur simultaneously or synchronously.

With reference now to FIG. 10(*a*), the execution begins with invocation of a root processes named "compute ( . . . ) . . . " which has been copied to phrase resolution memory of processor A at address "2000." During the course of resolving "2000 compute," processor A encounters instructions to perform a matrix addition process, which invokes the invocation "MATRIXADD(M,N:X)A2000." (The result address is given here, for the sake of example, as a symbolic address, but will be understood to be an address in result memory 132). The invocation "MATRIXADD(M,N:X) A2000" is placed in the ready queue of processor A with a return address ("A2000") indicating an address within the "compute" process where processor A is to report completion of the matrix addition. It will be assumed for this example that the "compute" process invokes the matrix addition process individually (not concurrently with other operations); therefore, processor A invokes itself to resolve "MATRIXADD(M,N:X)." Under other circumstances, processor A could invoke any of its neighbors to resolve the MATRIXADD process.

In forming the invocation for matrix addition, processor A will have checked a map of previously allocated memory in non-replicable definition memory 130 (FIG. 2), located unused space, and reserved the space needed by updating the memory map. Instructions for performing such an address allocation utility will be included within the "compute" process.

FIG. 10(*b*) illustrates the states of processors A,B,C,D a short time after the state shown in FIG. 10(*a*). The process "2000 compute( . . . ) . . . " is shown in small, light type, indicating that it is suspended (awaiting the completion of MATRIXADD). The invocation of MATRIXADD is shown in heavy, large and shaded type, indicating that it has been allocated space in general memory (designated as address 696) and is active on processor A.

With reference to FIG. 10(*c*), invocation "696 MATRIXADD(M,N:X)A2000" has progressed to the point where it is dividing the matrix addition into vector addition sub-processes. Processor A forms an invocation, "VECTORADD(MA,NA:XA)A696" for a first of the vector addition sub-operations. The invocation is placed in the ready queue of processor A, that is, processor A has invoked itself to resolve the first vector addition process. Note that the return address for VECTORADD, "A696", is the address of MATRIXADD (just as the return address of MATRIXADD is the address of "compute").

With reference to FIG. 10(*d*), process "696 MATRIXADD(M,N:X)A2000" has progressed to the point where it forms an invocation, "VECTORADD(MB,NB:XB) A696" for a second of the vector addition sub-operations. This second invocation is placed directly into the ready queue of processor B. A direct link exists between processors A and B through input/output buffers (157,158, FIG. 2) of respective processors.

The return address for this invocation of VECTORADD is the address of the MATRIXADD on processor A, that is, "A696." (The return address may also include an offset from the beginning address to an address where a service routine can be found for instructions to be executed after the VECTORADD has been completed.)

With reference to FIG. 10(*e*), process "696 MATRIXADD(M,N:X)A2000" on processor A has progressed to the point where it forms an invocation, "VECTORADD(MC,NC:XC)A696" for a third vector addition sub-operations. The VECTORADD for vectors C is placed in the ready queue for processor C with a return address of MATRIXADD on processor A.

As also shown in FIG. 10(*e*), on processor B, the process "VECTORADD(MB,NB:XB)A696" for vectors B is allocated memory and activated (at address "B890").

With reference to FIG. 10(*f*), process "696 MATRIXADD (M,N:X)A2000" on processor A has progressed to the point where it forms an invocation, "VECTORADD(MD, ND:XD)A696" for a fourth vector addition sub-operations. Processor A places the invocation "VECTORADD(MD, ND:XD)A696" for adding vectors D into the ready queue of processor D.

As also shown in FIG. 10(*e*), On processor B, process "890 VECTORADD(MB,NB:XB)A696" has begun resolution and has progressed to a point where it is spawning concurrent integer addition processes. Processor B places an invocation "INTEGERADD(MB1,NB1:XB1)B890" for adding integers of vectors B1 into its own ready queue. On processor C, the process "354 VECTORADD(MC,NC:XC) A696" has been allocated memory and is activated (at address "C354").

With reference to FIG. 10(*g*), process "696 MATRIXADD(M,N:X)A2000" on processor A has completely spawned off all (four) of the invocations it requires and is now suspended awaiting the resolution of these invocations. While "696 MATRIXADD(M,N:X)A2000" is suspended, processor A begins processing a new invocation from its ready queue. Processor allocates memory for process "234 VECTORADD(MA,NA:XA)A696" and begins its resolution.

On processor B, the process "890 VECTORADD(MC, NC:XC)A696" continues to spawn INTEGERADD processes, and places an invocation "INTEGERADD(MB2, NB2:XB2)B890" into the ready queue of processor A.

On processor C, the process "354 VECTORADD(MC, NC:XC)A696" has progressed to a point where it begins spawning concurrent INTEGERADD processes. Processor C places the invocation "INTEGERADD(MC1,NC1:XC1) C354" into its own ready queue.

On processor D, the process "121 VECTORADD(MD, ND:XD)A696" has been allocated memory and begun resolution.

There is now a process running on each of the four processors. Examples of the parallelism in the architecture should now be apparent. Processor A has spawned a first level of sub-operations (VECTORADD) to the other processors. While resolving these first-level sub-operations, processors A and B have begun spawning lower level sub-operations (INTEGERADD) to themselves and others of the same processors that are resolving first-level sub-operations. For example, "MATRIXADD(M,N:X)" on processor A invoked "VECTORADD(MB,NB:XB)" on processor B. Processor B, in turn, invoked "INTEGERADD(MB2, NB2:XB2)" on processor A. Invocations thus expand freely into the network, and any processor can be called upon to resolve invocations at differing levels of the resolution tree.

With reference to FIG. 10(*h*), on processor A, process "234 VECTORADD(MA,NA:XA)A696" has spawned a first INTEGERADD processes by placing an invocation "INTEGERADD(MA1,NA1:XA1)A234" into its own ready queue. On Processor B, processes "890 VECTORADD(MB, NB:XB)A696" spawns a third INTEGERADD processes for integers B3 by placing invocation "INTEGERADD(MB3, NB3:XB3)B890" in the ready queue of processor C. On processor C, processes "354 VECTORADD(MC,NC:XC) A696" spawns a second INTEGERADD processes for integers C2 by placing invocation "INTEGERADD(MC2, NC2:XC2)C354" in the ready queue of processor B. On processor D, processes "121 VECTORADD(MD,ND:XD) A696" has spawned a first INTEGERADD processes for integers D1 by placing the invocation "INTEGERADD (MD1,ND1:XD1)D121" into its own ready queue.

With reference to FIG. 10(*i*), on processor A, processes "234 VECTORADD(MA,NA:XA)A696" has spawned a second INTEGERADD processes by placing the invocation "INTEGERADD(MC2,NC2:XC2)C354" in the ready queue for processor B.

On processor B, processes "890 VECTORADD(MB, NB:XB)A696" suspends after having spawned three INTEGERADD processes because it must await resolution of those processes. Processor B begins processing a new invocation from its ready queue by allocating memory for process "760 INTEGERADD(MB1,NB1:XB1)B890" and activating that process.

On processor C, processes "354 VECTORADD(MC, NC:XC)A696" has spawned a third INTEGERADD processes for integers C3 by placing the invocation "INTEGERADD(MC3,NC3:XC3)C354" in the ready queue of processor D. On processor D, processes "121 VECTORADD(MD,ND:XD)A696" spawns a second INTEGERADD processes for integers D2 by placing invocation "INTEGERADD(MD2,ND2:XD2)D121" into the ready queue of processor C.

Note that each processor has spawned INTEGERADD processes to other processors. If more or fewer processors were present in the network, sub-processes would be distributed throughout available processors.

With reference to FIG. 10(j), on processor A, process "234 VECTORADD(MA,NA:XA)A695" spawns a third INTEGERADD processes for integers A3 by placing the invocation "INTEGERADD(MA3,NA3:XA3)A234" in the ready queue of processor D.

On processor B, process "760 INTEGERADD(MB1, NB1:XB1)B890" for integers B1 is completed and removed from memory (that is, its memory has been de-allocated). The result of that process is placed in processor B's own ready queue at return address 890, as instructed by the invocation.

On processor C, process "354 VECTORADD(MC, NC:XC)A696" suspends (awaiting the results of the three invocations it has spawned), processor C initiates processing on a new invocation from the ready queue. Processor C allocates memory for process "678 INTEGERADD(MC1, NC1:XC1)C354" and activates that process.

On Processor D, process "121 VECTORADD(MD, ND:XD)A696" spawns a third INTEGERADD processes for integers D3 by placing invocation "INTEGERADD (MD3,ND3:XD3)D121" into the ready queue of processor A.

With reference to FIG. 10(k), on processor A, process "234 VECTORADD(MA,NA:XA)A696" suspends (having spawned three INTEGERADD invocations to processors A, B, and D). Processor A begins processing a new invocation from its ready queue by allocating memory for process "456 INTEGERADD(MB2,NB2:XB2)B890" and activating that process.

On processor B, process "890 VECTORADD(MB, NB:XB) A696" remains suspended, and processor B begins processing a new invocation from its ready queue by allocating memory for process "645 INTEGERADD(MC2, NC2:XC2)C354" and activating that process.

On processor C, process "676 INTEGERADD(MC1, NC1:XC1)C354" has placed its result in result memory and notified itself that the process has been completed by placing a message "RETURN 354" in its own ready queue. Note that processor C responds to invocations received from itself in the same manner as it responds to invocations received from other processors, that is, by placing a RETURN message in the ready queue of the invoking processor. Memory for process "676 INTEGERADD(MC1,NC1:XC1)C354" is then de-allocated.

On processor D, process "121 VECTORADD(MD, ND:XD)A696" suspends (having spawned three INTEGERADD invocations). Processor D begins processing a new invocation from its ready queue by allocating memory for process "678 INTEGERADD(MD1,ND1:XD1)C121" and activating that process.

With reference to FIG. 10(l), on processor A, process "456 INTEGERADD(MB2,NB2:XB2)B890" has completed, placed a message "RETURN 890" into the ready queue for processor B, and been de-allocated from processor A's memory. Similarly, on processor B, process "645 INTEGERADD(MC2,NC2:XC2)C354" has completed, placed a message "RETURN 354" into the ready queue for processor C, and been de-allocated from processor B's memory.

Processor C, which completed and de-allocated an INTEGERADD process in FIG. 10(k), begins processing a new invocation from its ready queue by allocating memory for process "987 INTEGERADD(MB3,NB3:XB3)B890" and activating that process.

On processor D, process "678 INTEGERADD(MD1, ND1:XD1)D121" has completed, placed a message "RETURN 121" into the ready queue for processor D (itself), and been de-allocated from processor D's memory.

Figure 10M:
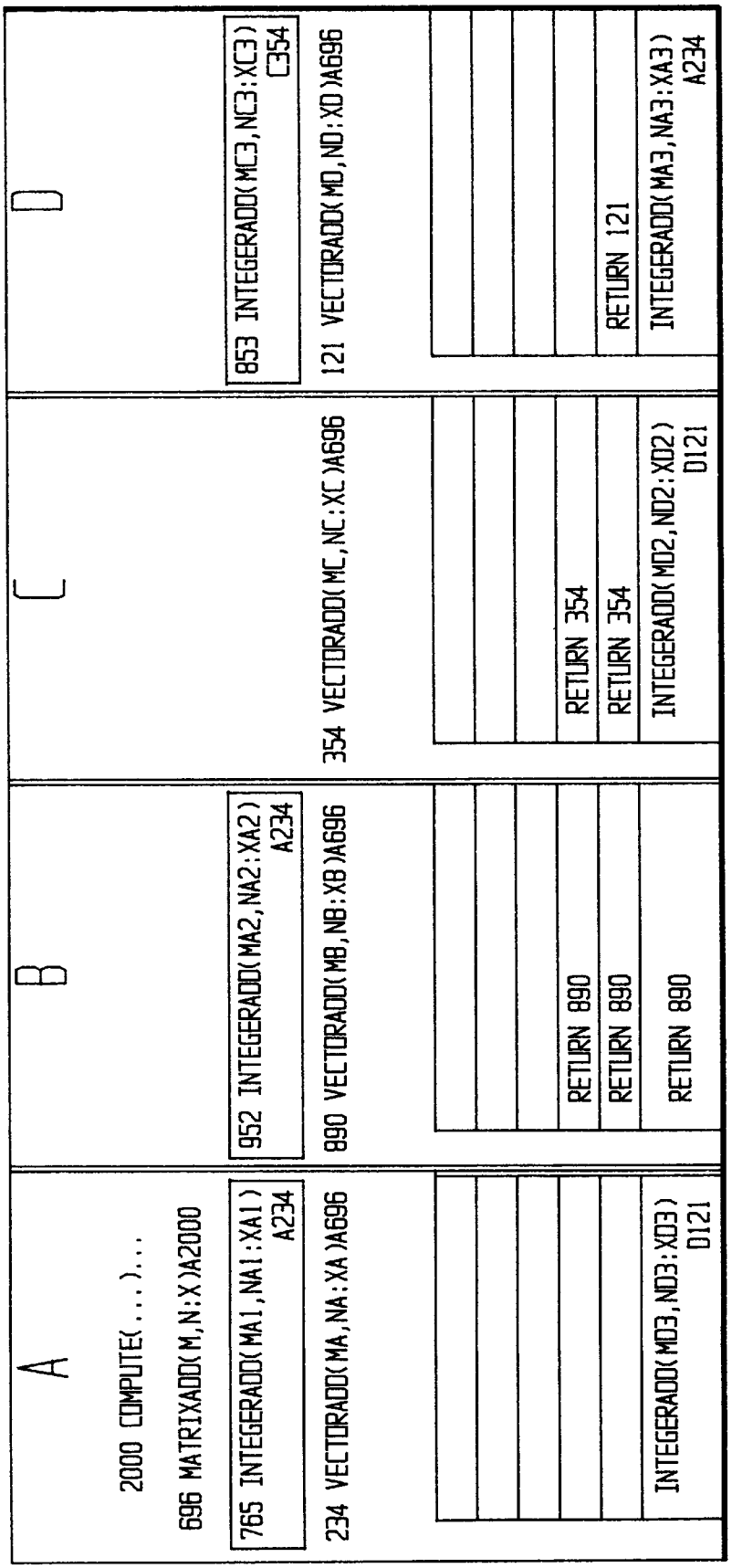

With reference to FIG. 10(m), processor A, which completed and de-allocated an INTEGERADD process in FIG. 10(l), begins processing a new invocation from its ready queue by allocating memory for process "765 INTEGERADD(MA1,NA1:XA1)A234" and activating it. Similarly, processor B, which completed and de-allocated an INTEGERADD process in FIG. 10(l), begins processing a new invocation from its ready queue by allocating memory for process "952 INTEGERADD(MA2,NA2:XA2)A234" and activating that process.

On processor C, process "987 INTEGERADD(MB3, NB3:XB3)B890" has completed, placed a message "RETURN 890" into the ready queue for processor B, and been de-allocated from processor C's memory. Processor D, which completed and de-allocated an INTEGERADD process in FIG. 10(l), begins processing a new invocation from its ready queue by allocating memory for process "853 INTEGERADD(MC3,NC3:XC3)C354" and activating that process.

Figure 10N:
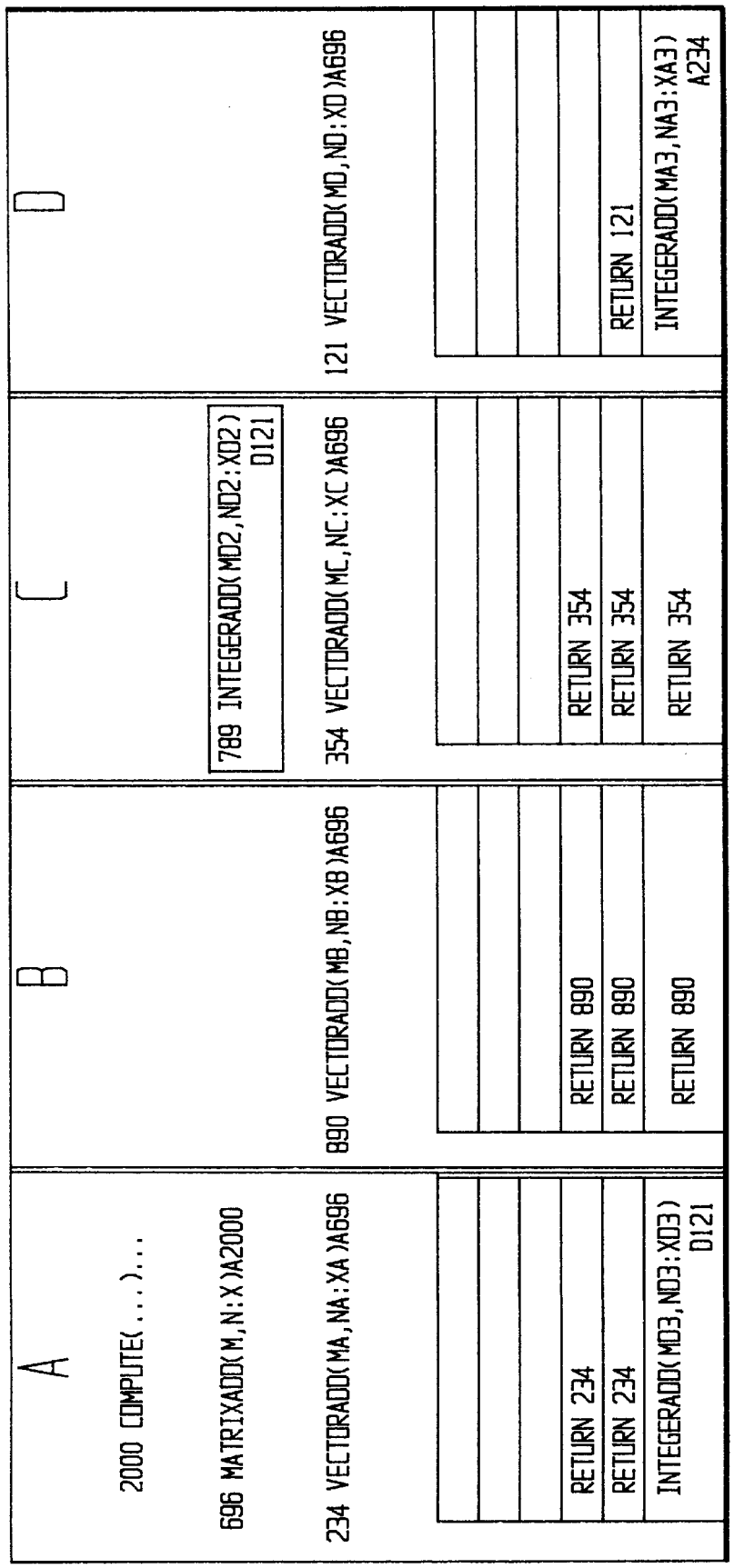

With reference to FIG. 10(n), on processor A, process "765 INTEGERADD(MA1,NA1:XA1)A234" has completed, placed a message "RETURN 234" into the ready queue for processor A (itself), and been de-allocated from processor A's memory. Similarly, on processor B, process "952 INTEGERADD(MA2,NA2:XA2)A234" has completed, placed a message "RETURN 234" into the ready queue for processor A, and been de-allocated from processor B's memory.

Processor C, which completed and de-allocated an INTEGERADD process in FIG. 10(l), begins processing a new invocation from its ready queue by allocating memory for process "789 INTERGERADD(MD2,ND2:XD2)D121" and activating that process.

On processor D, process "853 INTEGERADD(MC3, NC3:XC3)C354" has completed, placed a message "RETURN 354" into the ready queue for processor C, and been de-allocated from processor D's memory.

Note that prior to this stage, the number of invocations in the ready queues has increased, which corresponds to adding levels to the resolution tree. At this stage, the ready queues of processors B and C have only "returns" to process for the suspended VECTORADD for vectors B. The resolution tree corresponding to the MATRIXADD process will now begin to shrink as results are returned to higher-level processes, and lower-level processes are removed.

Figure 10O:
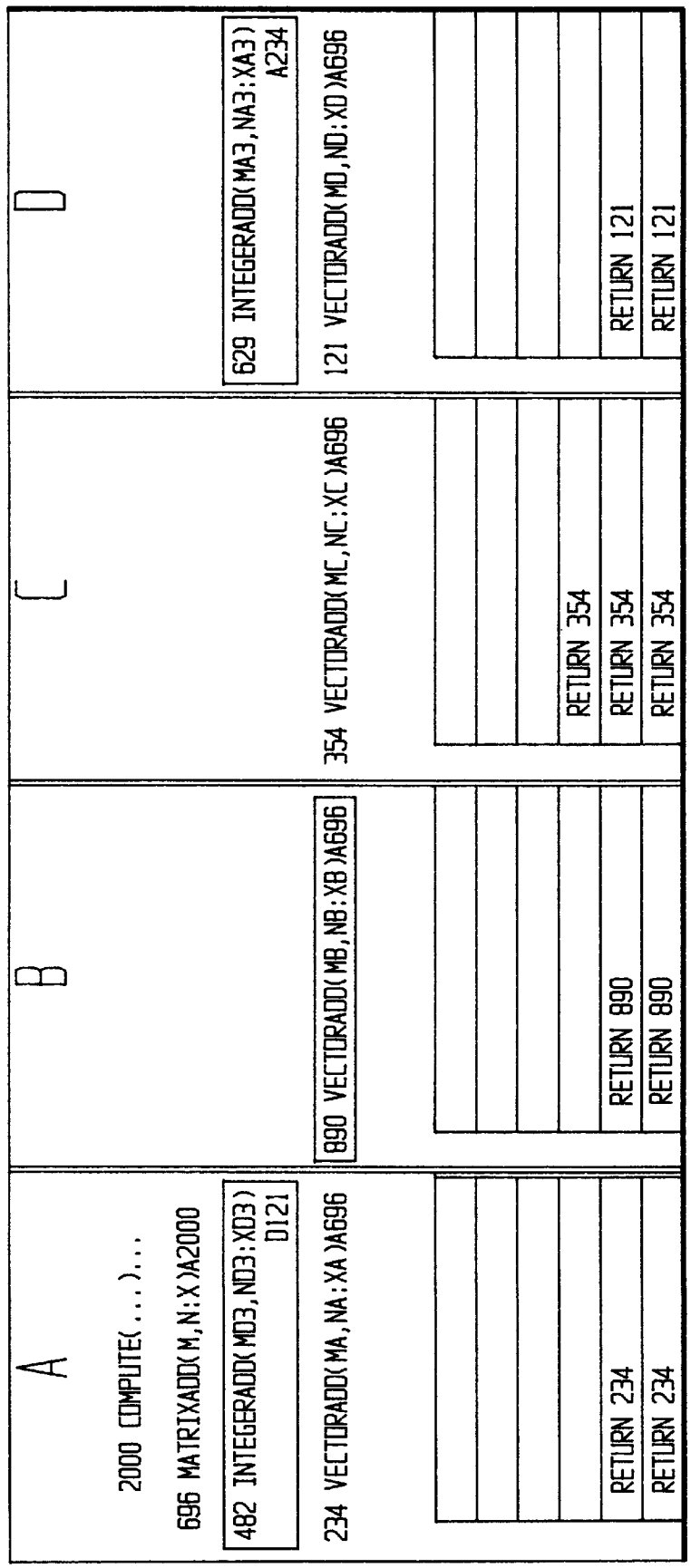

With reference to FIG. 10(o), processor A, which completed and de-allocated an INTEGERADD process in FIG.

10(h), begins processing a new invocation from its ready queue by allocating memory for process "482 INTEGERADD(MD3,ND3:XD3)D121" and activating that process.

Processor B, which completed and de-allocated an INTEGERADD process in FIG. 10(h), begins processing a new invocation from its ready queue. In this case, the entry from the ready queue is "RETURN 890." This return includes an address ("890") for an entry point back into process "890 VECTORADD(MB,NB:XB)A696." Processor B activates this VECTORADD process and begins executing instructions at the entry address.

On processor C, process "789 INTERGERADD(MD2, ND2:XD2)D121" has completed, placed a message "RETURN 121" into the ready queue for processor D, and been de-allocated from processor C's memory. Processor D, which completed and de-allocated an INTEGERADD process in FIG. 10(n), begins processing a new invocation from its ready queue by allocating memory for process "629 INTEGERADD(MA3,NA3:XA3)A234" and activating that process.

Figure 10P:
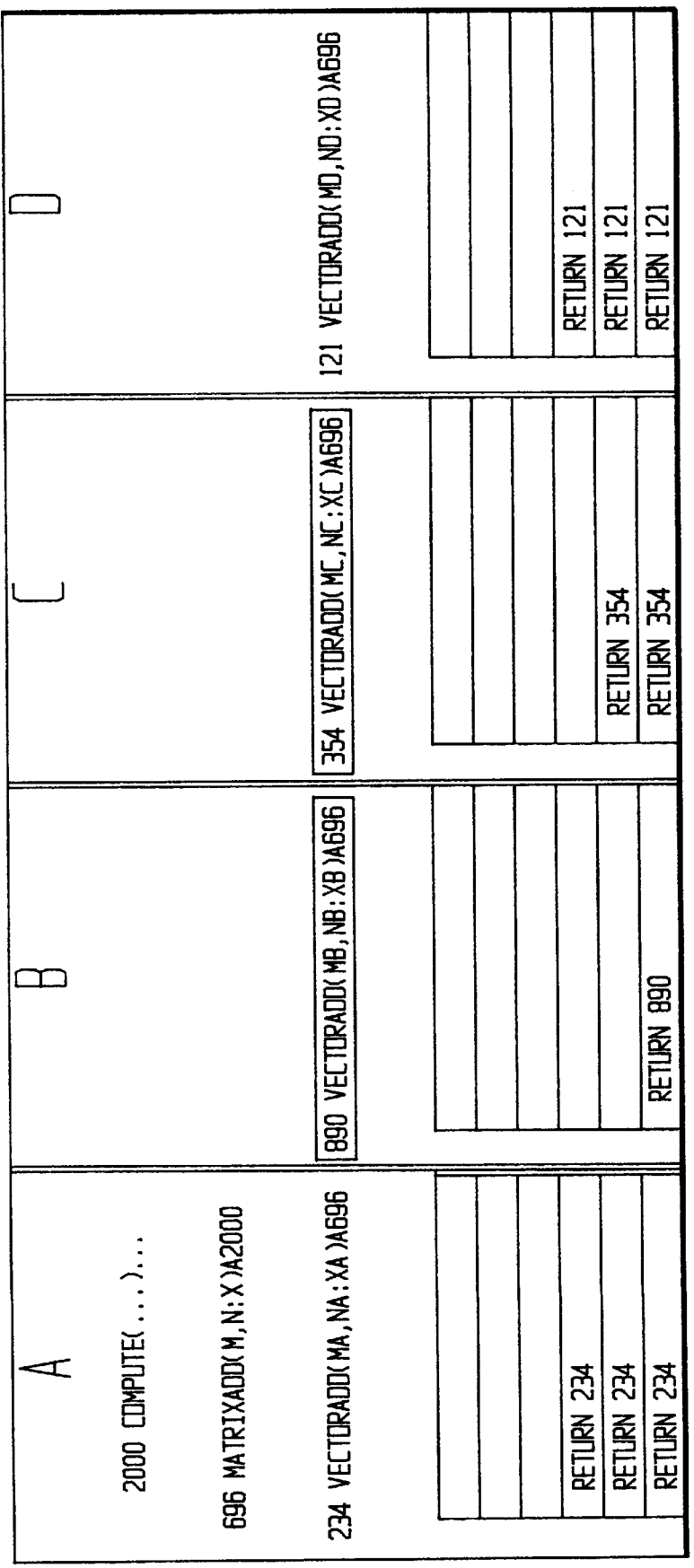

With reference to FIG. 10(p), on processor A, process "482 INTEGERADD(MD3,ND3:XD3)D121" has completed, placed a message "RETURN 121" into the ready queue for processor D, and been de-allocated from processor A's memory. On processor B, "890 VECTORADD (MB, NB:XB)1696" continues to process returns to address890 from the ready queue.

Processor C, which completed and de-allocated an INTEGERADD process in FIG. 10(o), begins processing a new invocation from its ready queue. In this case, the entry from the ready queue is "RETURN 354." This return includes an address ("354") for an entry point back into process "354 VECTORADD(MC,NC:XC)A696." Processor C activates this VECTORADD process and begins executing instructions at the entry address.

On processor D, process "629 INTEGERADD(MA3, NA3:XA3)A234" has completed, placed a message "RETURN 234" into the ready queue for processor A, and been de-allocated from processor D's memory.

Figure 10Q:
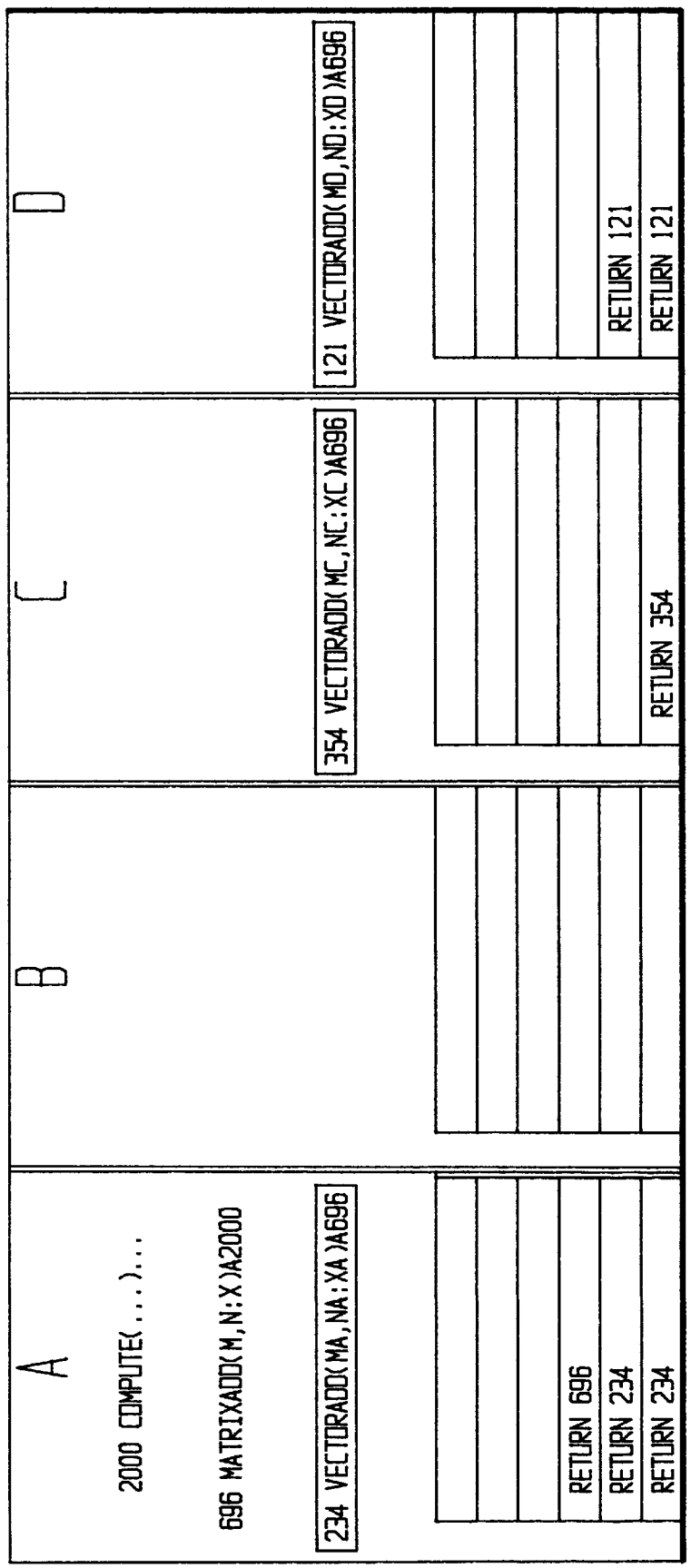

With reference to FIG. 10(q), processor A, which completed and de-allocated an INTEGERADD process in FIG. 10(p), begins processing a new invocation from its ready queue. In this case, the entry from the ready queue is "RETURN 234." This return includes an address ("234") for an entry point back into process "234 VECTORADD(MA, NA:XA)A696." Processor A activates this VECTORADD process and begins executing instructions at the entry address.

On processor B, process "890 VECTORADD(MB, NB:XB)A696" has completed processing the three "RETURN 890" messages from its ready queue, stored the result in result memory, and placed a "RETURN 696" message in the ready queue of processor A.

On processor C, process "354 VECTORADD(MC, NC:XC)A696" continues to process a second "RETURN 354."

Processor D, which completed and de-allocated an INTEGERADD process in FIG. 10(p), begins processing a new invocation from its ready queue. In this case, the entry from the ready queue is "RETURN 121." This return includes an address ("121") for an entry point back into process "121 VECTORADD(MD,ND:XD)A696." Processor A activates this VECTORADD process and begins executing instructions at the entry address.

With reference to FIG. 10(r), on processor A, process "234 VECTORADD(MA,NA:XA)A696" continues to process a second "RETURN 234." Processor B, which completed and de-allocated a VECTORADD process in FIG. 10(q), is now idle because its ready queue is empty. Processor B may, at this time, be invoked to process some other operation, but this is omitted for the purpose of this example.

On processor C, process "354 VECTORADD(MC, NC:XC)A696" has completed processing the three "RETURN 354" messages from its ready queue, stored the result in result memory, and placed a "RETURN 696" message in the ready queue of processor A. On processor D, process "121 VECTORADD(MD,ND:XD)A696" continues to process a second "RETURN 121."

Figure 10S:
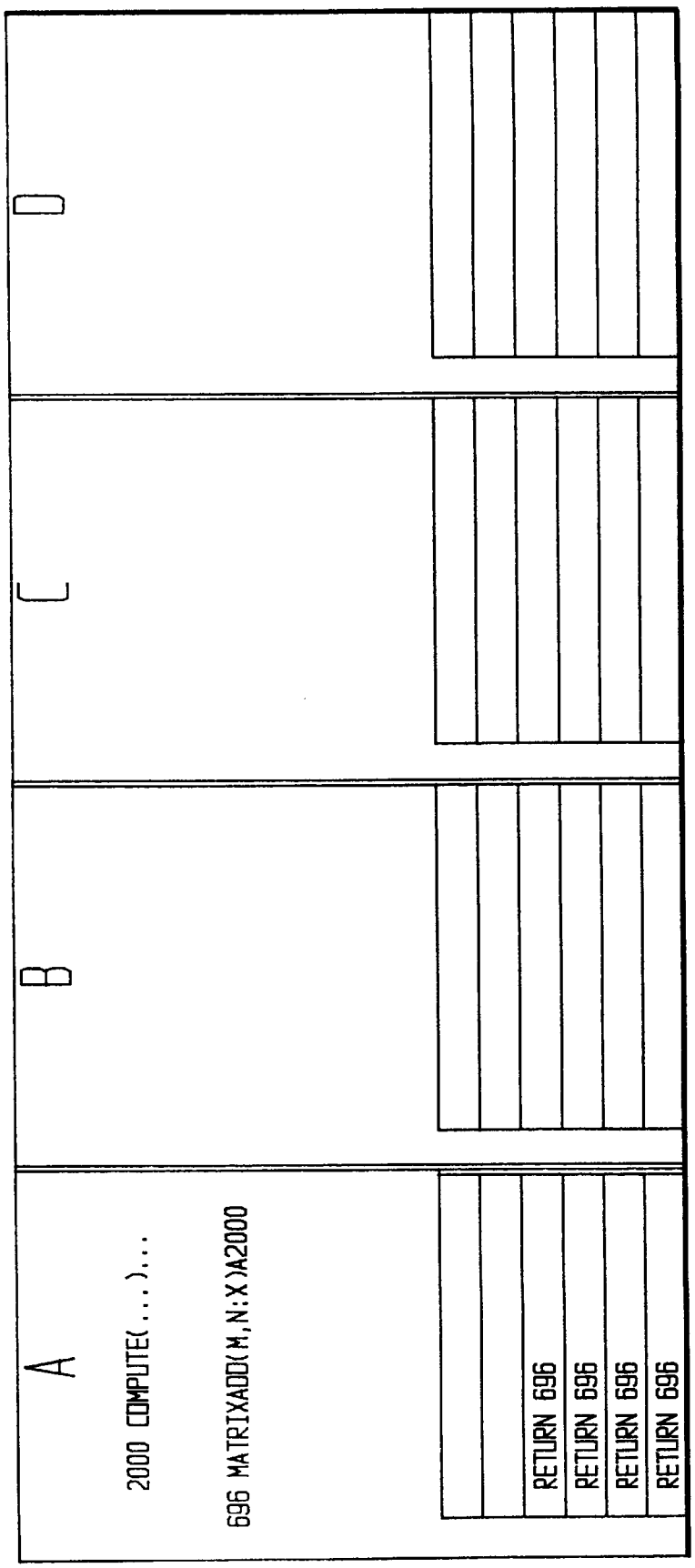

With reference to FIG. 10(s), on processor A, process "234 VECTORADD(MA,NA:XA)A696" has completed processing the three "RETURN 234" messages from its ready queue, stored the result in result memory, and placed a "RETURN 696" message in its own ready queue. Processors B and C are idle. On processor D, process "121 VECTORADD(MD,ND:XD)A696" has completed processing the three "RETURN 121" messages from its ready queue, stored the result in result memory, and placed a "RETURN 696" message in the ready queue of processor A.

For the remainder of this process, processors B, C, and D remain idle, and all remaining processing takes place on processor A.

Figure 10T:
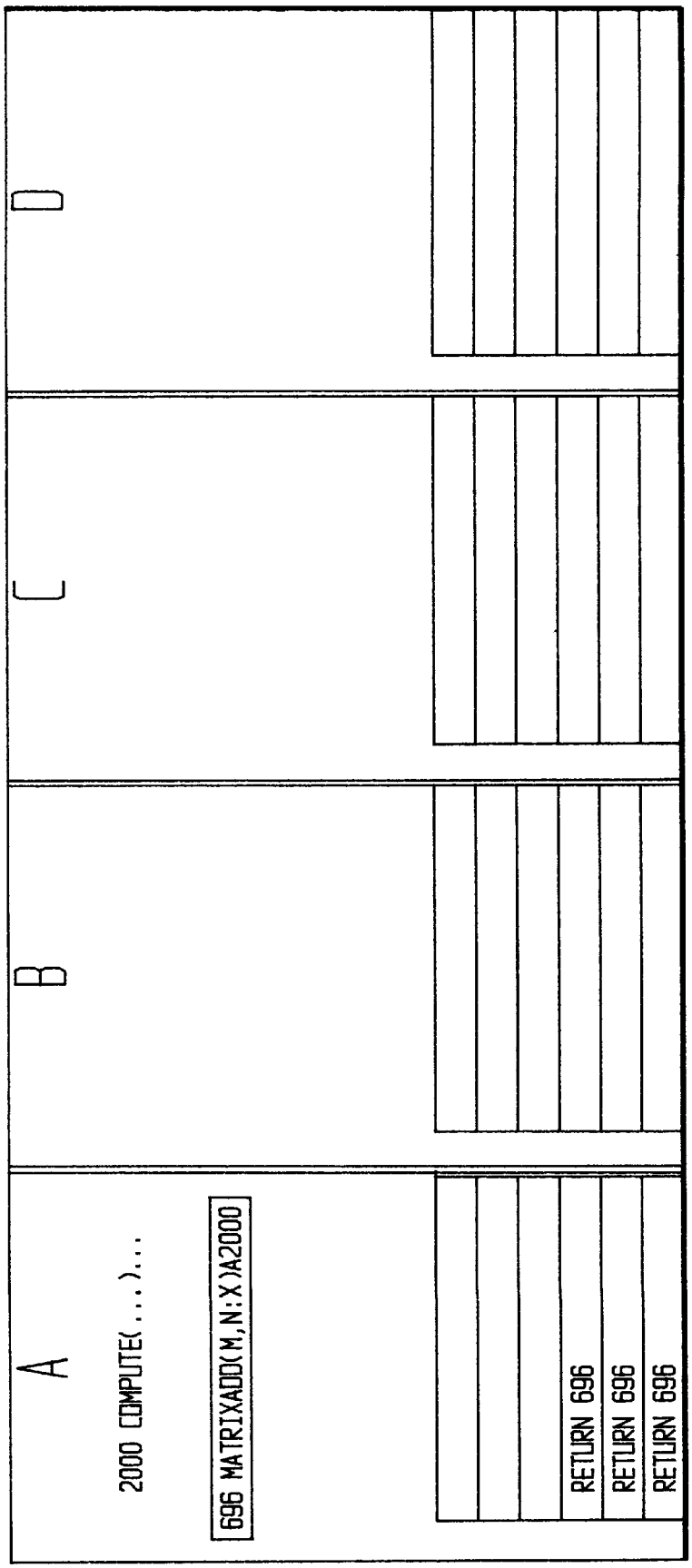

With reference to FIG. 10(t), processor A, which completed and de-allocated a VECTORADD process in FIG. 10(s), begins processing a new invocation from its ready queue. In this case, the entry from the ready queue is "RETURN 696." This return includes an address ("696") for an entry point back into process "696 MATRIXADD(M, N:X)A2000." Processor A activates this MATRIXADD process and begins executing instructions at the entry address.

Figure 10U:
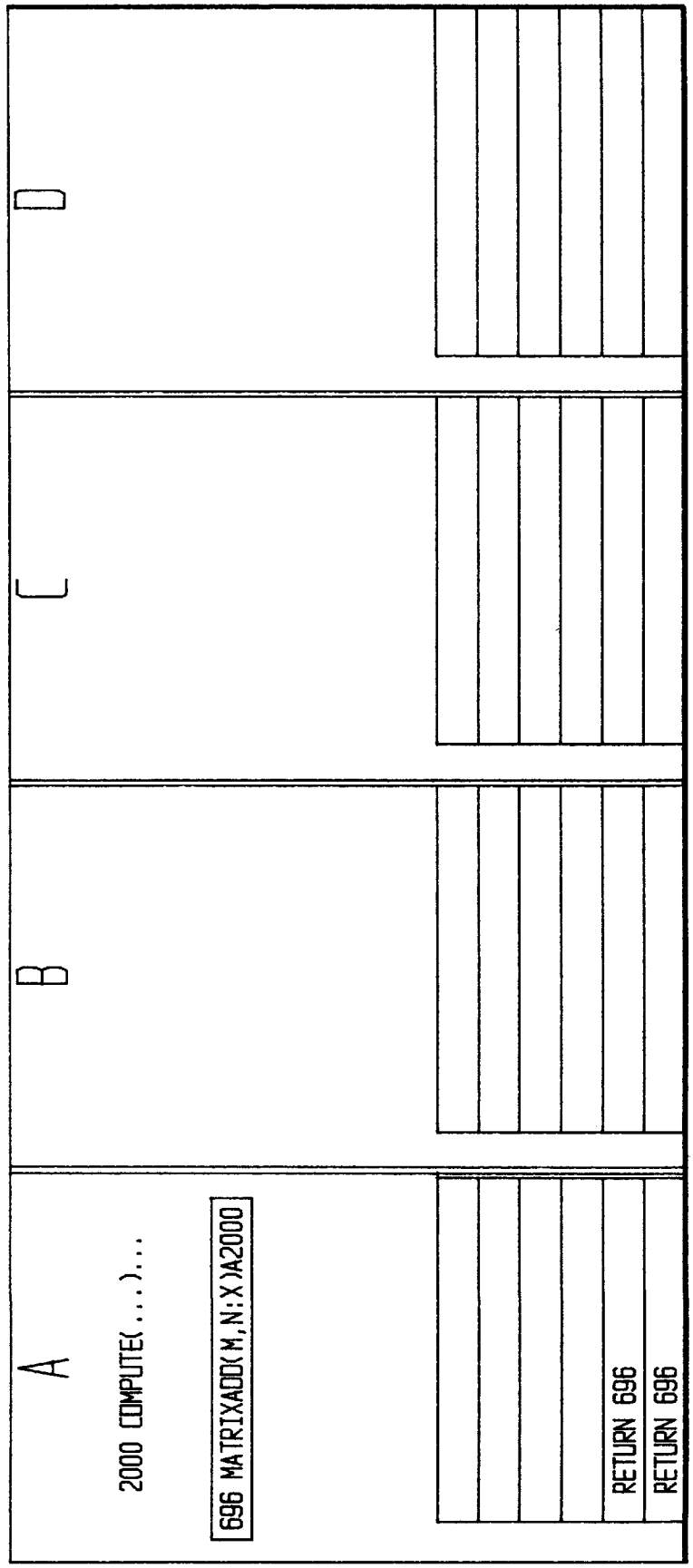
Figure 10V:
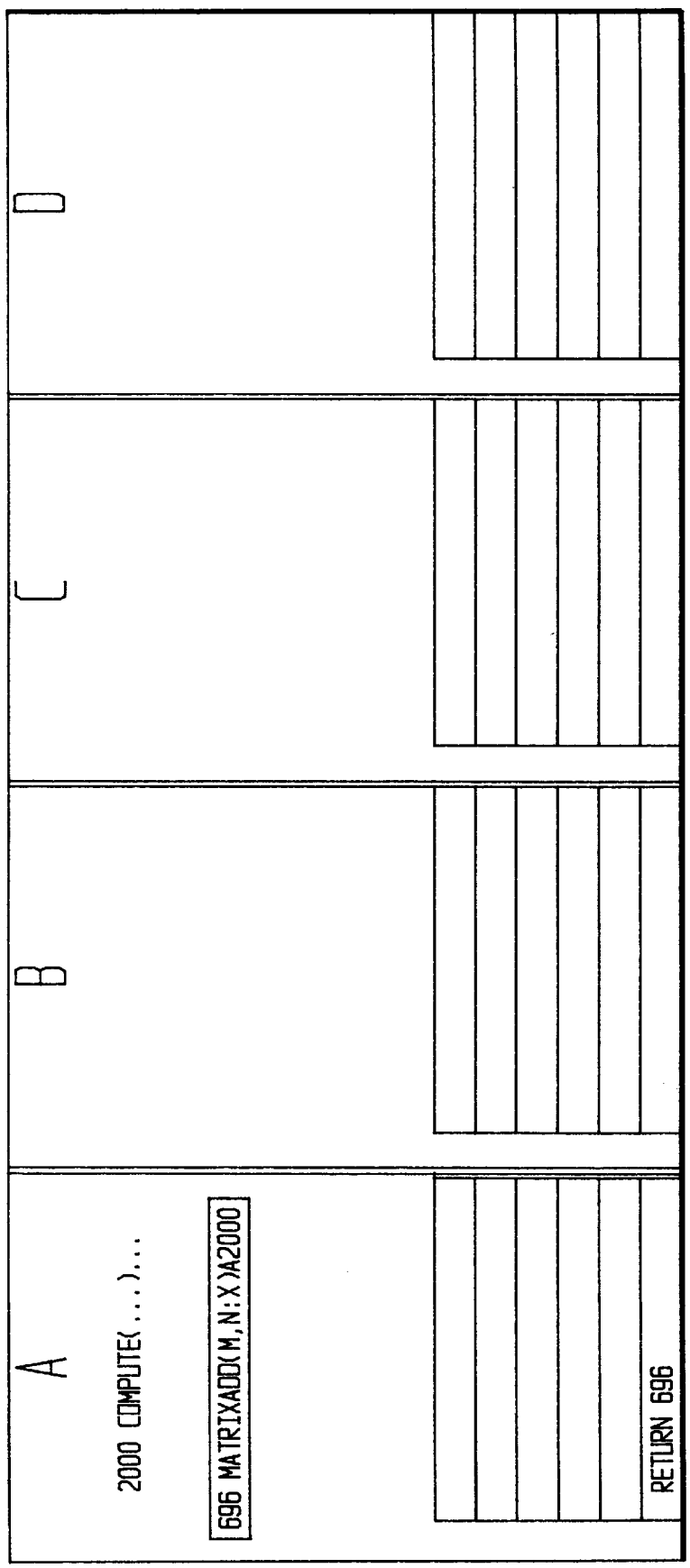

With reference to FIGS. 10(u) and 10(v), process "696 MATRIXADD(M,N:X)A2000" continues to process "RETURN 696" messages.

Figure 10W:
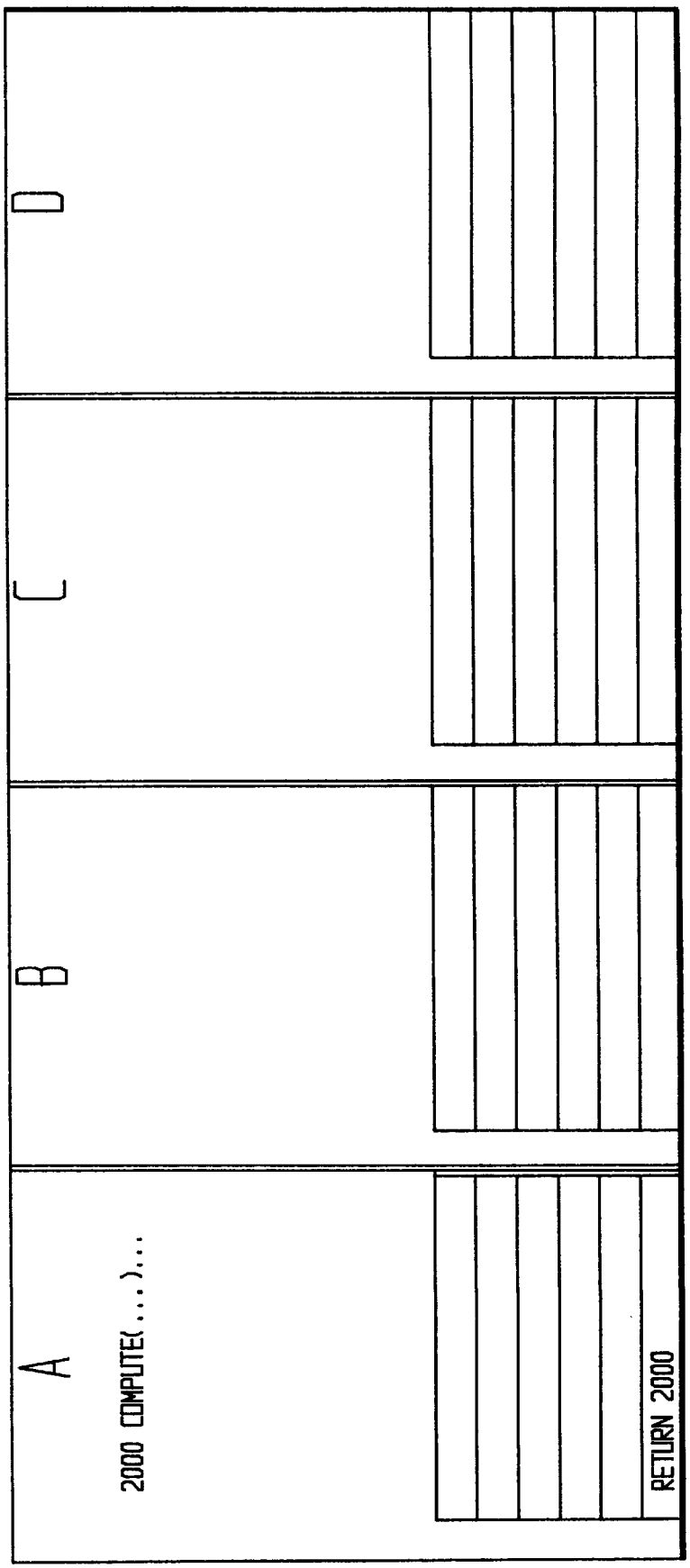

In FIG. 10(w), the last "RETURN 696" has been processed. Process "696 MATRIXADD(M,N:X)A2000" has completed processing the four "RETURN 696" messages from its ready queue, stored the result in result memory, and placed a "RETURN 2000" message in its own ready queue.

In FIG. 10(x), processor A, which completed and de-allocated the MATRIXADD process in FIG. 10(w), begins processing a new invocation from its ready queue. In this case, the entry from the ready queue is "RETURN 2000." This return includes an address ("2000") for an entry point back into process "2000 compute( ... ) ... " Processor A activates this process and begins executing instructions at the entry address.

The above example assumed only four general purpose processors. If a special purpose vector processor were available (120, FIG. 1), the VECTORADDs might have been invoked on that processor to speed up the processing. Further, for the sake of example, no DIGITADDs were spawned to other processors. Instead, INTEGERADDs were resolved as the lowest level invocation. The cutoff for deciding whether to divide a process or resolve it locally will generally depend on the capabilities of the processor and the overhead associated with spawning invocations. When it is more efficient to resolve in place than spawn, the processor will resolve in place.

In the example above, the invocations share certain common characteristics with machine-level instructions. The processors of the invocation architecture of the present invention directly interpret the internal mapping of these invocations. The structures of the internal expression such as the invocation, phrase, definition, object, etc., are the units of interpretation for the processors and the primitive units of direction to the invocation architecture. At the level of the invocation, the invocation architecture need not have any set of instructions, standard operations or primitive data types in the traditional sense (although individual processors may have traditional executive programs, such as a traditionally programmed multi-tasking operating system.)

Each processor interprets the internal expression one invocation at a time. How each processor carries out its interpretation internally is not relevant to the use or operation of the system. The processor can be conveniently viewed as a traditional sequential processor executing an interpreting program which is a sequence of traditional instructions. This program of traditional instructions is a constant to the processor just like microcode in conventional processors. This interpreting program is never altered and need not be considered during the mapping of external expressions into internal expressions.

User Programming

A user preparing a process for resolution by the invocation architecture of the present invention refers to an expression mapping dictionary of available process definitions that can be invoked. Every process definition in the dictionary is completely expressed within the invocation architecture, through to its terminal definitions. Therefore a user need only render a process expression until it invokes definitions in the dictionary and the invocation architecture completes the expression through all of its terminal definitions.

A user need not know whether a definition is rendered in hardware or in software. Indeed, the invocation architecture has no specific boundary between hardware and software definitions. Every definition in the invocation architecture is accessed by invocation. Whether an invocation is resolved by a hardware definition or a software definition is determined by the resources available in the invocation architecture and by an expression mapper.

In other words, using the matrix addition example described above, a user wishing to add two matrices would refer to a dictionary for the invocation architecture to determine whether a MATRIXADD possibility existed. If so, the user need only invoke the appropriate process with the correct actualities. The invocation architecture will resolve the invocation through all of its terminal definitions (the INTEGERADDs in the case of the MATRIXADD). As noted, the user need not know or be concerned about the software/hardware boundary in the architecture. For example, the vector operations of the VECTORADD may be performed on a special purpose Vector Processor 120, if one is available.

Every processor 102 and 120–128 has a local set of process definitions expressed directly in hardware as directly associated processes, DAPs. This set of definitions can be the arithmetic/logic operations of the traditional ALU as well as anything else that is generally useful and conveniently representable in hardware on that processor. The expression mapper maintains a list of the invocations in the dictionary of available definitions that are expressed in hardware along with their internal invocations. This internal invocation is the address or operation code of the hardware definition and is distinguishable from the addresses of definitions that are mapped into memory. When the processor encounters a hardware name, the invocation is resolved by the hardware instead of being further processed in software.

A hardware definition previously rendered in software can be added to the system with no impact on the application expressions resolving on the invocation architecture. The expression mapper's hardware name list can be updated and all future invocations of that definition will be resolved by the hardware. If an expression is not re-mapped, then it will still be resolved by the software definition which was not removed from the invocation architecture. In either case the addition of new capability has no impact on the correct resolution of the existing expressions.

Invocation Packets

A processor in the invocation architecture is invoked by being sent invocation packets from its neighboring processors. An invocation packet is a group of pointers to various resources including means to access the input values, means to deliver the result, and the authority to proceed.

The Phrase Heap

A processor in the invocation architecture is the place of resolution, but each processor must potentially service several invocations at the same time. Since each invocation (phrase) is an independently procedable unit of resolution, a processor can treat its processes as independent tasks that request services, sleep while waiting for results or resources, and are wakened when results or resources are available. This functionality is achieved with a phrase heap that is similar to an operating system task management environment.

The phrase heap 150 (FIG. 2) maintains the state of resolution of each phrase in the processor. The resolution tree corresponding to a particular process grows from neighboring processor to neighboring processor and distributes itself through the phrase heaps of the processors. The invocations from different parts of the tree layer themselves in the phrase heaps. As resolution proceeds the layers grow and shrink and eventually unwrap themselves through the phrase heaps. Several independent invocations can be spawned into the resolution environment and resolved simultaneously through the phrase heaps without interfering.

INITIALIZATION

The invocation architecture maximizes the efficiency in resolving concurrent processes by pre-distributing resources to the processors. Each processor (with its associated hardware and operating system) is itself a resource, and the use of multiple processors is a fundamental example of predistribution. Other resources which may be pre-distributed are possibility expressions and input data.

The architecture is initialized by broadcasting identical sets of possibility expressions (executable instructions) and actuality expressions (input data) to all processors via global possibility expression and input data broadcast bus 104. In terms of the invocation architecture, all possibilities are distributed to places of resolution and are merely awaiting identification of actualities to become complete processes. Resolution of processes is regulated by the manner and place of invocation formation. Having pre-distributed hardware, possibility expressions and input actuality expressions, only pointers and result data need now be exchanged.

The invocation packet for the root unitary operation is then sent to the ready queue of one of the processors to begin its resolution. Each unitary operation is treated as a task by the processor's executive. As the processor resolves the root invocation, invocation packets for concurrent sub-unitary operations are sent to the ready queues of neighbor processors.

Any processor can order the broadcasting of an initially mapped expression and initiate its resolution. The appropriate invocation is sent to an I/O processor 128 of a processor 102.

INVOCATION OF A ROOT NAME

The processor 102 which begins the resolution (the root processor) then begins transmitting invocations to neighboring processors 102 (and possibly, if needed, special purpose processors 120–128) and the resolution tree for the process begins distributing itself among the processors (102 and 120–128) of the invocation architecture 100.

DIVISION OF ROOT PROCESS INTO CONCURRENT UNITARY OPERATIONS AND RECURSIVE DIVISION

Resolution proceeds as the resolution tree proceeds through phrase heaps 150 on each processor 102. No single processor is in control of the resolution or even in touch with the whole state of the resolution. There is no central point of control in the invocation architecture 100 that assigns tasks or allocates processors. Preferably each processor, general 102 or special-purpose (102–128), runs an identical executive which absolutely controls that processor's local environment and which negotiates with elements of the invocation architecture 100 external to the processor. Control distributes itself through the invocation architecture as resolution takes place and resolution trees change.

The special purpose processors 120–128 are accessed by sending invocations to their respective input buffers over the global SPIP bus 106 which serializes access from neighbor connected processors 102 to the special purpose processors. Each special purpose processor services invocations from its input buffer 156 through invocations in its phrase heap 150 just like any other processor in the system and returns its results over the global bus 106 via its output buffer 158.

The only globally accessible state maintenance elements in the invocation architecture 100 are the dynamic data memories 130 and 132. Access to these dynamic data memories is serialized by the global dynamic data memory (DDM) bus 108. DDM bus 108 can be arranged to provide test-and-set access if semaphore-type coordination is required among the processors.

RECURSIVE DIVISION

When a processor receives an invocation packet, the packet is put in the processor's ready queue. The processor then proceeds through the ready queue in some predetermined priority order. As some unitary operations are sent to neighboring processors, and as the currently resolving unitary operations must wait for results, it is put in the waiting queue and the processor begins the next unitary operation in the ready queue. As results are returned from sub-unitary operations, the unitary operations are moved from the wait queue to the ready queue.

DO-IT-YOURSELF

A processor stops transmitting invocations to spawn concurrency and performs the resolution itself when it becomes more expensive and slower to send the invocation to another processor than to resolve it locally. This decision depends on the local capabilities of the processor and the bandwidth of the interconnections between the processors. If a processor possesses a standard ALU and the interconnection path is one number wide, then the time for local resolution is when the invocation invokes single number arithmetic operations. An integer addition can be carried out quicker than or as quickly as the invocation can be transmitted to another processor.

In general, the first level of structure of the native operations of the processor is the inherent granularity of concurrency of the invocation architecture. For example, if a vector processor gets an invocation for a vector addition, it will perform the whole vector addition in place. The vector is therefore the point at which to stop generating concurrency for the vector processor.

FEATURES

In the invocation architecture, special purpose processors 120–128 are just like the general neighbor-connected processors 102 except that, as noted, they have extra capabilities beyond those of the general processors 102. The special purpose processors are accessed by sending invocations to their respective input buffers over the global SPIP bus 102. Global SPIP bus 106 serializes access from neighbor-connected general processors 102 to the special purpose processors 120–128. Each special purpose processor services invocations from its input buffer just like any other processor in the system 100 (through phrases in a phrase heap) and returns its results to an appropriate location over the global SPIP bus 102.

The only globally accessible state maintenance elements in the invocation architecture are dynamic data memories 130 and 132. Access to memories 130 and 132 is serialized by the Dynamic Data Memory (DDM) global bus 108. This DDM bus 108 can be arranged to provide test-and-set access if semaphore-type coordination among the processors is needed.

The architecture provides for a graceful degradation of performance as processors or interconnections among processors fails. By addition of simple acknowledgements when invocations are exchanged, a non-responsive processor becomes recognized as such to its neighbors. Neighbors then simply stop sending invocations to the non-responsive processor.

By addition of a simple time-out, an uncompleted process previously sent to a non-responsive processor can be flagged and re-routed to other, responsive processors. Once a processor determines that a neighbor processor is not functioning, it can isolate all of the threads in its queues that are dependent on the tardy processor, and then create new invocation packets to other responsive neighbors. This strategy works even if a timer pre-maturely cuts out a properly-functioning processor that merely has a deep queue. When the prematurely clipped sub-tree returns its results (and when a replacement invocation has been sent to another processor), the results returned from the tardy processor are merely ignored.

Fault detection can be accomplished by sending redundant invocations. Each invocation can simply be spawned twice to two different neighbors. The invocation is not considered resolved until both results are returned, compared and found to agree. If results do not agree, the invoking processor can repeat the invocation to different neighbors and compare additional results to diagnose the faulty neighbor. After diagnosed as faulty, no further invocations are sent to the defective processor.

A communications protocol can also be implemented to detect faulty invocations sent by a faulty processor. When faulty invocations fail to satisfy the protocol, the faulty processor is recognized as such, and neighbors stop communicating with (and ignore communications from) the faulty processor. If a partially defective processor erroneously concludes that all its neighbors are faulty, the defective processor will stop communicating with all neighbors and idle itself.

Processors can take local action to achieve fault tolerance. Processors can periodically initiate checks on neighbor processors by, for example, sending identical invocations to neighbors during idle periods. If a special processor fails, homogeneous processors can substitute software invocations.

After learning of the embodiments described above, people practicing in this art will be able to make variations that fall within the spirit and scope of the invention. The embodiments described above are exemplary but not intended to limit unduly the scope of the invention as defined by the following claims.

What is claimed is:

1. An invocation architecture for generally concurrent process resolution comprising:
a plurality of interconnected processors, some of the processors being homogeneous processors,
each homogeneous processor being capable of creating an invocation for a connected processor to have the connected processor resolve the invocation, wherein the invocation is an expression containing sufficient information for a process to proceed, and
each processor capable of being invoked by a connected processor to resolve invocations.

2. An invocation architecture as in claim 1, further comprising:
a plurality of input/output controllers;
an input/output bus;
a first global bus connecting each of the homogeneous processors to each of the plurality of input/output controllers;
a second global bus connecting each of the homogeneous processors to at least one special purpose processor; and
a third global bus connecting each of the processors to at least one shared memory.

3. An invocation architecture as in claim 2, wherein the special purpose processors include at least some of:
a vector processor, a string processor, a logic processor, and a database processor.

4. An invocation architecture as in claim 2, wherein the input/output controllers include at least some of:
a disk controller, a tape controller, a printer controller, and a communications controller.

5. An invocation architecture as in claim 2, wherein the special memories include:
a non-replicable definition memory, and
a result memory.

6. An invocation architecture for generally concurrent process resolution comprising:
a plurality of interconnected processors, some of the processors being homogeneous processors, each homogeneous processor being capable of invoking a connected processor to have the connected processor resolve invocations, and each processor capable of being invoked by a connected processor to resolve invocations;
at least one input/output controller;
an input/output bus;
a first global bus connecting each of the homogeneous processors to the input/output controller;
a second global bus connecting each of the homogeneous processors to at least one special purpose processor;
a third global bus connecting each of the homogeneous processors to at least one shared memory; and
wherein each of the plurality of homogeneous processors comprises:
an activity agent;
an ALU connected to the activity agent;
a plurality of local memories local to the homogeneous processor and connected to the activity agent;
a result data cache connected to the activity agent and connecting the processor to the third global bus;
a possibility expression and input data memory connected to the activity agent and connecting the homogeneous processor to the first global bus; and
an input buffer and an output buffer, each buffer connected to the activity agent and each buffer connecting the processor to the second global bus and to neighboring homogeneous processors of the plurality of processors.

7. An invocation architecture as in claim 6, wherein the local memories include a phrase resolution memory with a phrase heap.

8. A method of controlling an invocation architecture for carrying out a process,
the process defined by instructions, and the process being carried out by resolving the instructions defining the process with respect to a data set,
at least some instructions being divisible into component operations, and at least some operations being divisible into sub-operations,
the architecture comprising:
a plurality of interconnected processors, some of the processors being homogeneous processors and others of the processors being special purpose processors,
each homogeneous processor being capable of invoking a connected processor to have the connected processor resolve instructions, and
each processor capable of being invoked by a connected processor to resolve instructions at the invocation of the connected processor,
each processor capable of resolving at least some of the instructions,
wherein a plurality of processors resolves an instruction by
(1) resolving all or some of the component operations of the instruction; and
(2) invoking at least one of the plurality of processors to resolve all, some, or none of the component operations of the instruction other than the component operations of the instruction resolved by the processor itself,
the method comprising the steps of:
invoking a first processor of the plurality of interconnected processors to resolve an instruction of the process.

9. The method of claim 8, wherein resolving an instruction consists of resolving the instruction with respect to data, wherein the process is carried out with respect to an input data set by invoking a processor to resolve an instruction of the process with respect to the input data set.

10. The method of claim 9, wherein the architecture includes a memory shared between the plurality of processors, wherein each processor has a local memory, and wherein instructions are resolved by a processor with respect to data in the shared memory and data in the local memory of the processor.

11. The method of claim 8, wherein a processor invokes a connected processor to resolve instructions by identifying, for each instruction of the instructions:
a) a name of the instruction;
b) data required by the instruction; and
c) a location for reporting completion of the instruction.

12. The method of claim 11, wherein a processor completes an invocation when the processor has resolved all instructions with which it was invoked and wherein each processor is capable of reporting, to an invoking processor, the completion of an invocation.

13. The method of claim 12, wherein the network carries out the process by invoking a processor of the plurality of interconnected processors by identifying:

a) the first instruction of the process;

b) the input data set; and c) a location for reporting completion of the process.

14. The method of claim 13, wherein each processor is capable of awaiting completion of an invocation of another processor.

15. An invocation architecture for generally concurrent process resolution comprising:

a plurality of interconnected processors, some of the processors being homogeneous processors, each homogeneous processor being capable of creating an invocation for a connected processor to have the connected processor resolve the invocation wherein the invocation is an expression that contains necessary and sufficient information for a process to proceed, and each processor capable of being invoked by a connected processor to resolve invocations;

at least one input/output controller;

an input/output bus;

a first global bus connecting each of the homogeneous processors to the input/output controller;

a second global bus connecting each of the homogeneous processors to at least one special purpose processor; and a third global bus connecting each of the homogeneous processors to at least one shared memory.

16. An invocation architecture as in claim 15 further comprising an expression mapping dictionary.

17. An invocation architecture as in claim 15 wherein each interconnected processor receives identical executable instructions and input data at initialization.

18. An invocation architecture as in claim 15 wherein:

a homogeneous processor is an invoking processor which has invoked an adjacent processor; and the invoking processor detects non-responsiveness of the adjacent processor.

19. An invocation architecture as in claim 18 wherein the invoking processor detects non-responsiveness of the adjacent processor by determining that the adjacent processor has not completed an invocation within a specified period of time.

* * * * *